United States Patent

Shirahama et al.

[11] Patent Number: 5,446,645
[45] Date of Patent: Aug. 29, 1995

[54] INVERTER APPARATUS AND UINTERRUPTIBLE POWER SUPPLY USING THE SAME

[75] Inventors: Hidefumi Shirahama; Yorito Jifuku; Akira Kobayashi; Keizo Shimada; Norikazu Tokunaga, all of Hitachi; Yoshimi Sakurai, Hitachiota; Ikuo Yamato, Hitachi; Tomoaki Mino, Hitachi; Satoru Inukai, Hitachi, all of Japan

[73] Assignee: Hitachi, Ltd., Tokyo, Japan

[21] Appl. No.: 19,642

[22] Filed: Feb. 18, 1993

[30] Foreign Application Priority Data

Feb. 18, 1992 [JP] Japan ................ 4-030366
Aug. 24, 1992 [JP] Japan ................ 4-224270

[51] Int. Cl.6 .............. H02M 7/515; H02J 3/38
[52] U.S. Cl. ................... 363/71; 363/55; 363/95; 307/58; 307/82
[58] Field of Search ........... 363/71, 55, 72, 95, 363/65; 307/58, 64, 82

[56] References Cited

U.S. PATENT DOCUMENTS 3,864,620 2/1975 Abbondanti .............. 321/27 R
4,947,310 8/1990 Kawabata et al. ............ 363/71
5,121,314 6/1992 Moriya ........................ 363/65
5,191,519 3/1993 Kawakami .................... 363/71
5,257,180 10/1993 Sashida et al. ............... 363/71

FOREIGN PATENT DOCUMENTS 492396 1/1992 European Pat. Off.
510601 10/1992 European Pat. Off.
6382631 12/1989 Japan.

Primary Examiner—Steven L. Stephan
Assistant Examiner—Adolf Berhane
Attorney, Agent, or Firm—Antonelli, Terry, Stout & Kraus

[57] ABSTRACT

In a uninterruptible power supply in which a plurality of inverters are operated in parallel, a current control loop is provided which responds to the magnitude of an output current of each inverter brought into parallel running to change a command value for a voltage waveform control circuit associated with each inverter, and the gain of the current control loop is made to be variable, whereby currents shared by the inverters can be set desirably to effectively suppress a cross current flowing between the inverters upon establishment of parallel running.

4 Claims, 23 Drawing Sheets

INVERTER APPARATUS AND UINTERRUPTIBLE POWER SUPPLY USING THE SAME

BACKGROUND OF THE INVENTION

The present invention relates to an inverter apparatus and an uninterruptible power supply and more particularly to inverter apparatus and uninterruptible power supply suitable for stably operating inverters in parallel by suppressing an inverter output overcurrent during transition.

When driving a load of large capacity with power supply apparatus of small capacity or when constructing a highly reliable power supply system by multiplexing power supply apparatus in parallel, a method is adopted in which a plurality of power supply apparatus are operated or brought into running with their output terminals connected in parallel. A conventional inverter parallel running method will be described by taking an uninterruptible power supply for instance. The uninterruptible power supply is a power supply apparatus which, normally, receives power fed from a commercial alternating current system but in the event of power failure utilizes power of a storage battery to supply AC power of predetermined voltage and predetermined frequency to a load without causing interruption of service, and typically it comprises an uninterruptible power supply unit including a rectifier (converter), an inverter and a storage battery and a control circuit for controlling the uninterruptible power supply unit. The rectifier converts AC power fed from the commercial alternating current system into DC power which in turn is used to charge the storage battery and also as an input to the inverter. In the event of power failure, the storage battery substitutes for the rectifier in order to supply DC power to the inverter. Then, the inverter receives the supply of DC power from the rectifier or storage battery to deliver stable AC power of predetermined voltage and predetermined frequency. When connecting a plurality of uninterruptible power supply of the above construction in parallel and operating them, differences in voltage and phase between inverter output voltages of the uninterruptible power supply must be suppressed to minimize a current flowing between the uninterruptible power supply, that is, a cross current with the aim of protecting the power supply apparatus from overcurrent. Conventionally, a method for suppressing the cross current has been known as disclosed in JP-A-1-255475, according to which a phase difference and a voltage difference between output voltages of the individual inverters are detected, whereby the frequency of each inverter output voltage is so corrected as to suppress the phase difference and the magnitude of each inverter output voltage is so corrected as to suppress the voltage difference. There are available various kinds of methods for detection of phase difference and voltage difference, including a method disclosed in the aforementioned Laid-open Patent Application according to which a phase difference is detected indirectly by using a difference between effective power levels delivered out of the individual inverters and a voltage difference by using a difference between reactive power levels.

When the above method for detection of phase difference and voltage difference is adopted, the phase difference and voltage difference have to be detected in terms of DC components and therefore a filter having a time constant of several of tens of milliseconds is used in a detection circuit. This can ensure that a cross current flowing upon parallel throw-in of the inverters can be suppressed during a time interval of several of tens of milliseconds by the impedance of a main circuit on the output side of the inverter. But with recent improvements in performance of power semiconductor devices, there has arisen a tendency toward the use of a high frequency inverter in which the switching frequency of inverter is raised aiming at miniaturization of the filter adapted to decrease ripples in inverter output. In this type of high frequency inverter, the main circuit impedance on the inverter output side is low and hence it is difficult to suppress overcurrent on the inverter output side by using only the main circuit impedance. If an instantaneous voltage control scheme is adopted in which voltage of an output filter is instantaneously matched with a command value with a view of taking full advantage of high-speed response characteristics of high frequency inverter, a decrease in output voltage due to an overcurrent on the output side is corrected instantaneously and therefore suppression of an overcurrent due to impedance of the output filter cannot be expected.

SUMMARY OF THE INVENTION

An object of the present invention is to provide an inverter apparatus and an uninterruptible power supply which can solve the aforementioned problems.

Another object of the invention is to provide improved inverter apparatus and uninterruptible power supply which can suppress an overcurrent occurring on the output side when high frequency inverters are brought into parallel running.

Further objects of the invention will become apparent from the following description.

To solve the above problems, an inverter apparatus according to the invention comprises a plurality of inverters each having its input side connected to a DC power supply and its output side connected to the same load and a plurality of control circuits for controlling the inverters, wherein each of the control circuits includes (1) voltage detection means for detecting an output voltage of an inverter, (2) current detection means for detecting an output current of the inverter, (3) first difference detection means for detecting a difference between output voltages of the plurality of inverters, (4) a parallel running control circuit responsive to output signals of the voltage detection means and the first difference detection means to generate a sinusoidal voltage waveform command signal complying with frequency and amplitude of a voltage which the inverter should deliver, (5) second difference detection means for converting an output signal of the current detection means into a voltage signal and detecting a difference between the voltage signal and an output signal of the parallel running control circuit, (6) third difference detection means for detecting a difference between output signals of the second difference detection means and the voltage detection means and (7) control means for controlling the duty of the inverter such that the difference between the output signals of the second difference detection means and voltage detection means is minimized.

To solve the above problems, an uninterruptible power supply according to the invention comprises a plurality of uninterruptible power supply units each including a rectifier for converting AC power fed from a commercial alternating current system into DC power, an inverter connected to the output side of the rectifier to convert the DC power into AC power and a storage battery for supplying DC power to the inverter in the event of power failure of the commercial alternating current system, inverters of the plurality of uninterruptible power supply units being connected at their output sides to the same load, and a plurality of control circuits for controlling the uninterruptible power supply units, wherein each of the control circuits includes (1) voltage detection means for detecting an output voltage of an uninterruptible power supply unit, (2) current detection means for detecting an output current of the uninterruptible power supply unit, (3) first difference detection means for detecting a difference between output voltages of the plurality of uninterruptible power supply units, (4) a parallel running control circuit responsive to output signals of the voltage detection means and the first difference detection means to generate a sinusoidal voltage waveform command signal complying with frequency and amplitude of a voltage which the uninterruptible power supply unit should deliver, (5) second difference detection means for converting an output signal of the current detection means into a voltage signal and detecting a difference between the voltage signal and an output signal of the parallel running control circuit, (6) third difference detection means for detecting a difference between output signals of the second difference detection means and the voltage detection means and (7) control means for controlling the duty of the inverter such that the difference between the output signals of the second difference detection means and voltage detection means is minimized.

With the above construction, the frequency and amplitude of a voltage which each inverter should deliver are determined by means of the parallel running control circuit responsive to the output signals of the voltage detection means and first difference detection means to generate a sinusoidal voltage waveform command signal complying with frequency and amplitude of the voltage which the inverter should deliver and at that time the frequency and amplitude of the voltage which the inverter should deliver are corrected by means of the second difference detection means for converting the output signal of the current detection means into a voltage signal and detecting a difference between the voltage signal and the output signal of the parallel running control circuit, with the result that over-current occurring upon parallel throw-in of the inverters can be suppressed.

DESCRIPTION OF THE PREFERRED EMBODIMENTS

Inverter apparatus of the invention will now be described in greater detail by way of example with reference to the accompanying drawings.

Figure 1:
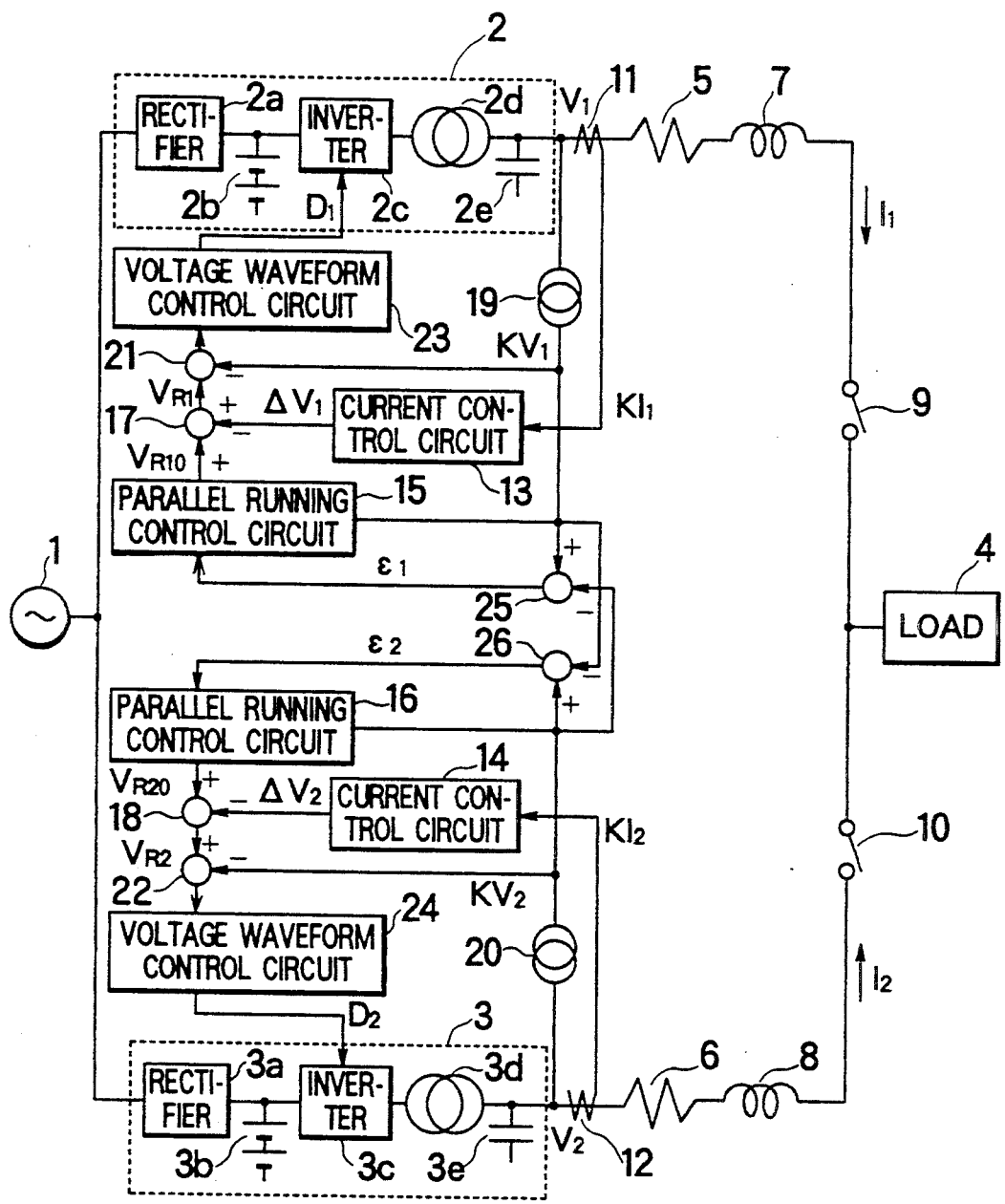
FIG. 1 is a schematic circuit construction diagram showing a first embodiment of an uninterruptible power supply to which the invention is applied.

FIG. 1 is a schematic circuit construction diagram showing an uninterruptible power supply to which the inverter apparatus of the invention is applied and as shown therein the uninterruptible power supply is comprised of uninterruptible power supply units and control circuits. In the figure, reference numeral 1 designates a commercial alternating current system, 2 and 3 uninterruptible power supply units having their input sides connected to the commercial alternating current system 1, and 4 a load connected to output sides of the uninterruptible power supply units 2 and 3 through respective series circuits of resistor 5, reactor 7 and switch 9 and resistor 6, reactor 8 and switch 10. The resistors 5 and 6 and reactors 7 and 8 represent wiring impedance. Each of the uninterruptible power supply units 2 and 3 includes a rectifier 2a or 3a connected to the commercial alternating current system 1, inverter 2c or 3c connected to the output side of the rectifier 2a or 3a, a storage battery 2b or 3b connected to a juncture between rectifier 2a and inverter 2c or a juncture between rectifier 3a and inverter 3c, a transformer 2d or 3d connected between inverter 2c and resistor 5 or between inverter 3c and resistor 6, and a capacitor 2e or 3e connected to a juncture between transformer 2d and resistor 5 or a juncture between transformer 3d and resistor 6. Normally each of the inverters 2c and 3c is operative to receive DC power resulting from rectification of electric power fed from the commercial alternating current system 1 by means of the rectifier 2a or 3a but in the event of power failure receive DC power fed from the storage battery 2b or 3b, and converts the DC power into AC power in order to supply stable AC power to the load 4. The transformer 2d or 3d is essentially adapted to insulate the load 4 from the commercial alternating current system 1 but its leakage reactance cooperates with the capacitor 2e or 3e to constitute an output filter of the inverter 2c or 3c. The control circuit for the uninterruptible power supply unit 2 or 3 includes a current detector 11 or 12 for detecting an output current of the inverter 2c or 3c, a current control circuit 13 or 14 for delivering a voltage signal $\Delta V1$ proportional to a detection signal kI1 of the current detector 11 or a voltage signal $\Delta V2$ proportional to a detection signal kI2 of the current detector 12, a parallel running control circuit 15 or 16 for generating a sinusoidal voltage waveform command signal VR10 or VR20 complying with frequency and amplitude of a voltage which the uninterruptible power supply unit 2 or 3 should deliver, an adder 17 or 18 for adding the output signal $\Delta V1$ of current control circuit 13 while inverting its polarity to the output signal VR10 of parallel running control circuit 15 to detect a difference VR1 between voltage signal $\Delta V1$ and voltage waveform command signal VR10 or the output signal $\Delta V2$ of current control circuit 14 while inverting its polarity to the output signal VR20 of parallel running control circuit 16 to detect a difference VR2 between voltage signal $\Delta V2$ and voltage waveform command signal VR20, a voltage detector 19 or 20 for detecting an output voltage V1 of the inverter 2c or an output voltage V2 of the inverter 3c, an adder 21 or 22 for adding an output signal kV1 of voltage detector 19 while inverting its polarity to the output signal VR1 to detect a difference between output signals kV1 and kV2 or an output voltage kV2 of voltage detector 20 while inverting its polarity to the output signal VR2 to detect a difference between output signals VR1 and VR2, a voltage waveform control circuit 23 or 24 responsive to the output signal of the adder 21 or 22 to generate a signal D1 or D2 for control of the inverter 2c or 3c, and an adder 25 or 26 for applying a difference signal $\epsilon1$ between output signals of the voltage detectors 19 and 20 to the parallel running control circuit 15 or a difference signal $\epsilon2$ between output signals of the voltage detectors 19 and 20 to the parallel running control circuit 16. The parallel running control circuit 15 receives, in addition to the difference signal $\epsilon1$, an input signal which is the output signal kV1 of the voltage detector 19 adapted to detect the output voltage of the uninterruptible power supply unit 2c to be controlled by the circuit 15. Similarly, the parallel running control circuit 16 receives, in addition to the difference signal $\epsilon2$, an input signal which is the output signal kV2 of the voltage detector 20 adapted to detect the output voltage of the uninterruptible power supply unit 3c to be controlled by the circuit 16.

Figure 2:
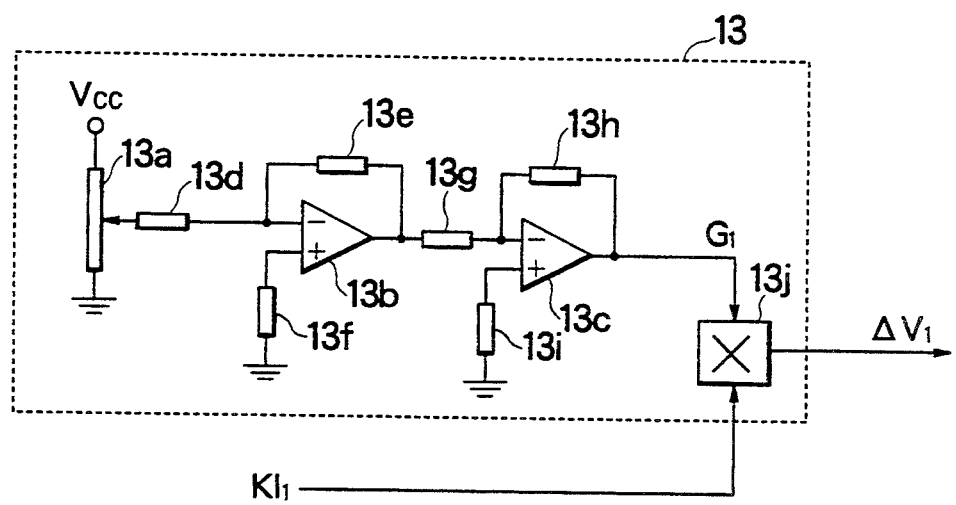
FIG. 2 is a circuit diagram showing details of a current control circuit used in the FIG. 1 uninterruptible power supply.

The current control circuit 13 (or 14) is constructed as exemplified in FIG. 2. DC voltage Vcc is divided by a variable resistor 13a to provide a division voltage and the detection signal kI1 of current detector 11 is multiplied by a signal G1 proportional to the division voltage to provide an output signal $\Delta V1$. The signal G1 represents sensitivity of the current control circuit 13 to the detection signal kI1 and by manipulating the variable resistor 13a, it can be set to a value which permits the uninterruptible power supply unit 2 to operate stably. Denoted by 13b and 13c are operational amplifiers, by 13d, 13e, 13f, 13g, 13h and 13i are resistors and by 13j a multiplier.

Figure 3:
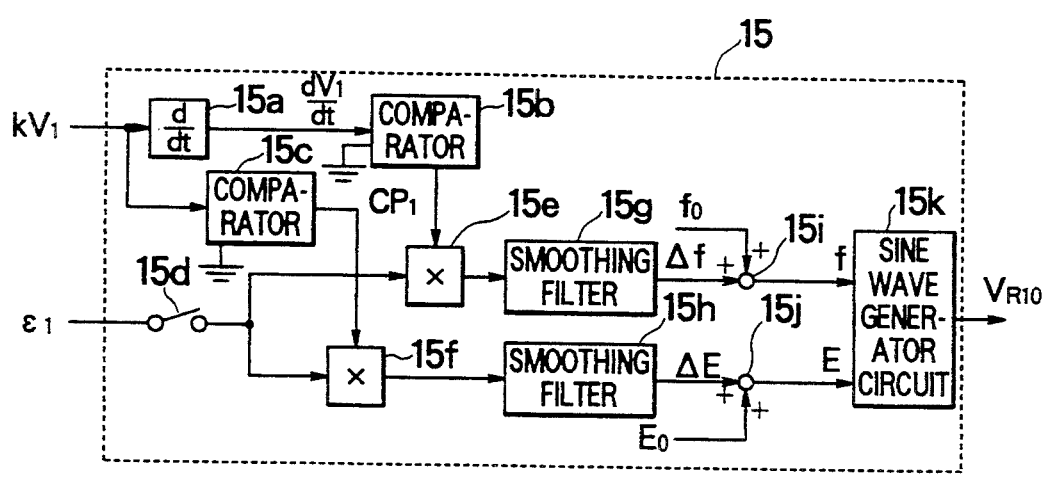
FIG. 3 is a circuit diagram showing details of a parallel running control circuit used in the FIG. 1 uninterruptible power supply.
Figure 4:
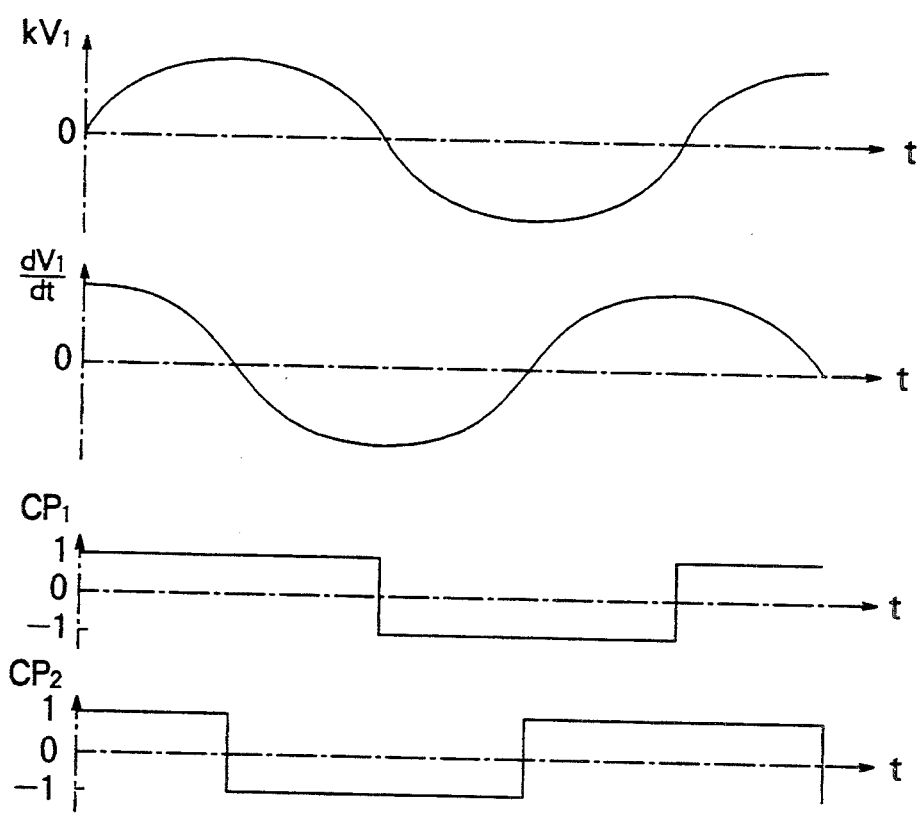
FIG. 4 is a waveform diagram for explaining the operation of the FIG. 3 parallel running control circuit.

The parallel running control circuit 15 (or 16) is constructed as exemplified in FIG. 3. In this circuit, the output signal kV1 of voltage detector 19 is passed through a comparator 15c to prepare a signal CP1 as shown in FIG. 4 and is also passed through a differentiating circuit 15a and a comparator 15b to prepare a signal CP2 whose phase leads that of signal CP1 by an electrical angle 90°. Only during closure of a switch 15d, the voltage difference $\epsilon1$ is multiplied by the signal CP1 to provide a signal which in turn is passed through a smoothing filter 15h to prepare a voltage correction value $\Delta E$ in the form of a DC signal, the voltage difference $\epsilon1$ is also multiplied by the signal CP2 to provide a signal which in turn is passed through a smoothing filter 15g to provide a frequency correction value $\Delta f$ in the form of a DC signal, an adder 15i prepares a frequency command f (f=of+$\Delta f$) from a reference frequency command fo and the frequency correction value $\Delta f$, an adder 15j prepares a voltage command E from a reference voltage command Eo and the voltage correction value $\Delta E$, and a sine wave generator circuit 15k prepares a sinusoidal voltage waveform command VR10 complying with the frequency command f and voltage command E.

The operation of the uninterruptible power supply provided with the control circuit having the above construction will be described. As will be seen from the block diagram of FIG. 3, the parallel running control circuit 15 receives as inputs a signal kV1 proportional to an output voltage V1 of the uninterruptible power supply unit 2 and a voltage difference signal $\epsilon1$ between the signal kV1 and a signal kV2 proportional to an output voltage V2 of the uninterruptible power supply unit 3 and determines frequency and amplitude of a voltage which the uninterruptible power supply unit 2 should deliver to prepare a sinusoidal voltage waveform command signal VR10. As will be seem from the block diagram of FIG. 2, the current control circuit 13 delivers a signal $\Delta V1$ proportional to an output current I1. Based on the thus obtained signals, a voltage waveform command signal VR1(=VR10−$\Delta V1$) for a voltage waveform control loop is determined and the voltage waveform control circuit 23 controls the duty command signal D1 of inverter 2c such that the difference between VR1 and output voltage V1 is minimized. The above holds true in the operation of the uninterruptible power supply unit 3.

In the FIG. 1 circuit construction described previously, consider an instance where only the second uninterruptible power supply provided with the uninterruptible power supply unit 3 is initially turned on by closing only the switch 10 to drive the load 4 and thereafter the first uninterruptible power supply provided with the uninterruptible power supply unit 2 is thrown in in parallel with the second uninterruptible power supply. In this case, the switches 15d as shown in FIG. 3 is first closed to operate the parallel running control circuits 15 and 16 and then the switch 9is thrown in to establish parallel running of the first and second uninterruptible power supply. At that time, if a difference takes place between output voltages V1 and V2 of the first and second uninterruptible power supply units because of delays in response of the filters 15g and 15h shown in FIG. 3 and a difference in response characteristics between the voltage waveform control circuits 23 and 24, a cross current flows between the two uninterruptible power supply. Especially, when taking into account the fact that only the wiring resistors 5 and 6 and reactors 7 and 8 constitute impedance contributory to current suppression, it will be understood that each inverter dangerously tends to come in overcurrent condition in the absence of the current control circuits 13 and 14. However, in FIG. 1, the current control circuits 13 and 14 deliver output signals $\Delta V1$ and $\Delta V2$, by which voltage waveform command signals VR10 and VR20 are corrected to thereby suppress the overcurrent effectively.

Figure 5:
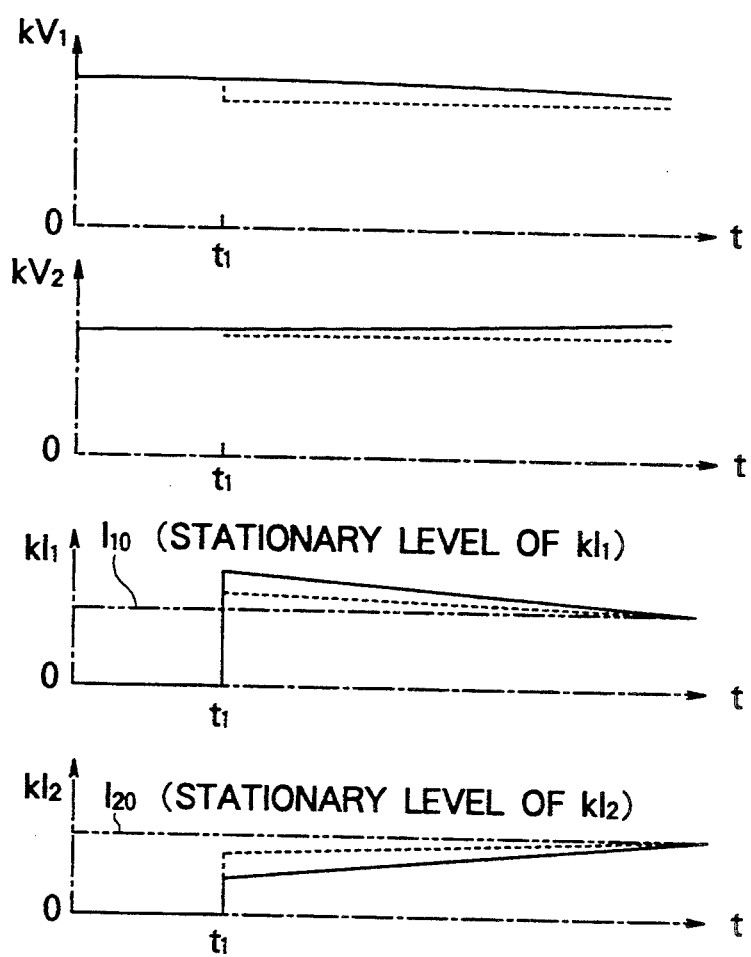
FIG. 5 is a waveform diagram for explaining the operation of the FIG. 1 uninterruptible power supply.

Operational waveforms in the above procedure are depicted in FIG. 5. On the assumption that output voltage V1 of the first uninterruptible power supply is larger than output voltage V2 of the second uninterruptible power supply, FIG. 5 shows responses and amplitude magnitude of output signals kV1 and kV2 of the voltage detectors 19 and 20 and output signals kI1 and kI2 of the current detectors 11 and 12. Responses developing in the absence of the current control circuits 13 and 14 are represented by solid-line waveforms and responses developing in the presence of the current control circuits 13 and 14 are represented by dotted-line waveforms. As the switch 9 is first thrown in at a time point t1, a cross current flows as shown at solid lines between the two uninterruptible power supply in the absence of the current control circuits 13 and 14 owing to the difference between V1 and V2, causing current I1 to become larger than a stationary level I10. Current I2 on the other hand becomes smaller than a stationary level I20. Subsequently, the parallel running control circuits 15 and 16 take action to suppress the difference in output voltage between both the uninterruptible power supply and concomitantly therewith the currents I1 and I2 settle to the stationary levels. Contrary to this, in the presence of the current control circuits 13 and 14, the magnitude of output voltages of the two uninterruptible power supply is suppressed in accordance with the magnitude of currents I1 and I2 as shown at dotted lines and as a result the voltage difference between the two uninterruptible power supply is decreased, thereby suppressing the difference between the currents I1 and I2. Accordingly, in accordance with the present embodiment, cross current which flows between a plurality of uninterruptible power supply upon parallel running of the uninterruptible power supply can be suppressed effectively.

The present embodiment has been described by way of parallel running of a plurality of uninterruptible power supply but the invention is not limited thereto and may be applied, without alternation, to the case of parallel running of ordinary inverter apparatus devoid of storage batteries.

Figure 6:
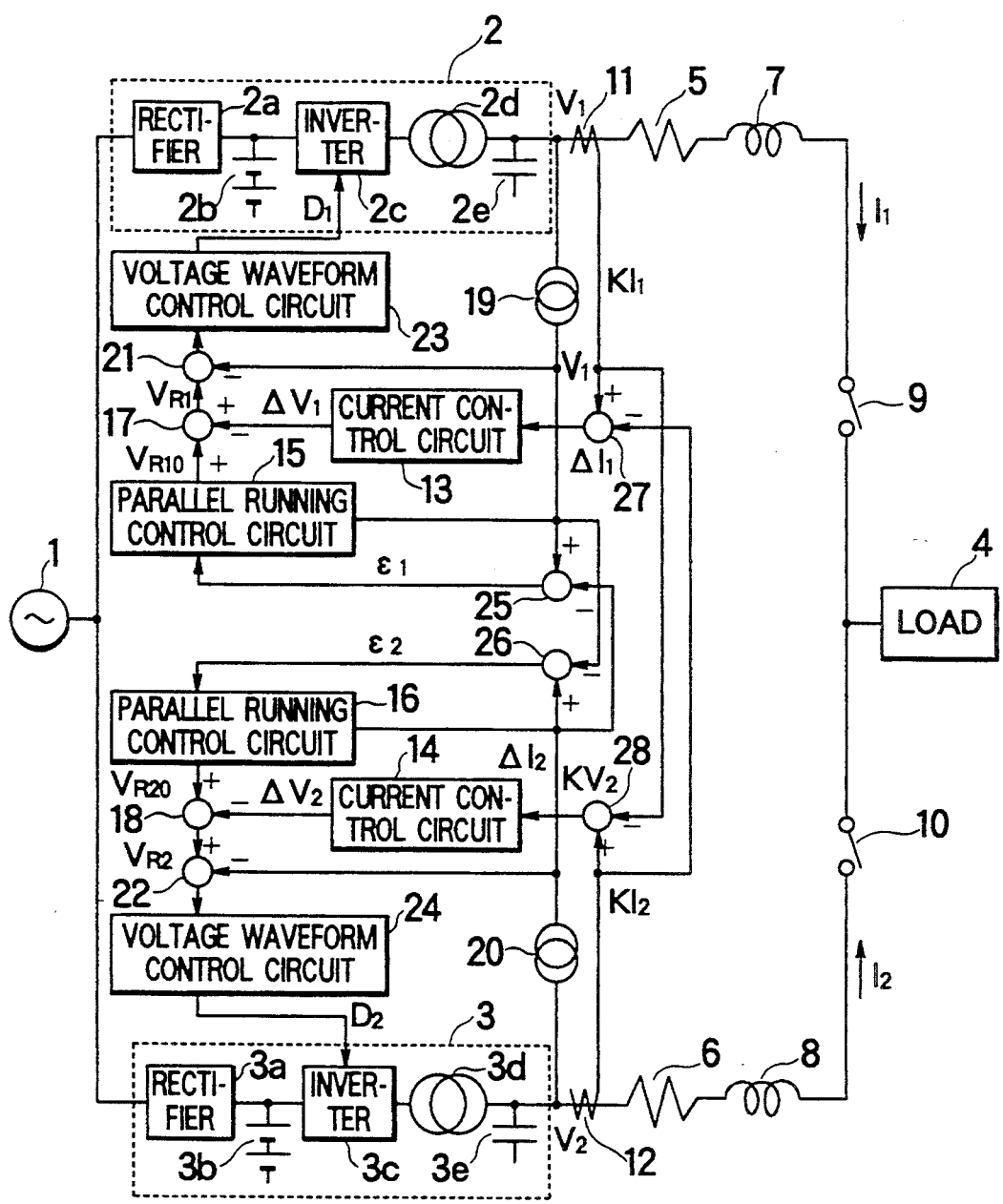
FIG. 6 is a schematic circuit construction diagram showing a second embodiment of the uninterruptible power supply to which the invention is applied.
Figure 7:
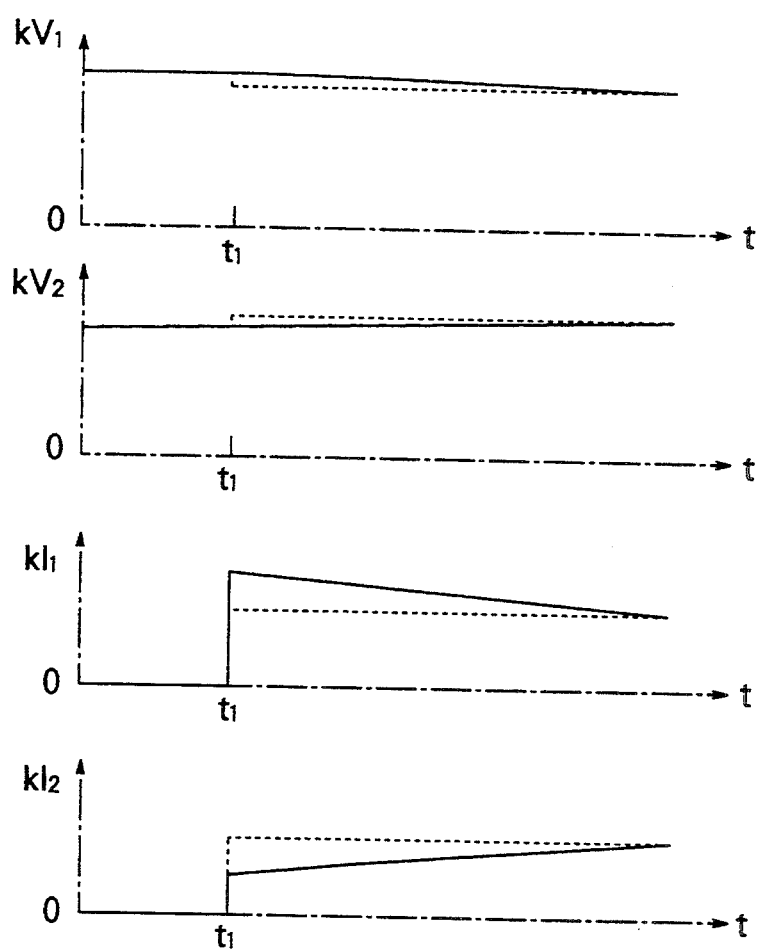
FIG. 7 is a waveform diagram for explaining the operation of the FIG. 6 uninterruptible power supply.

FIG. 6 is a schematic circuit diagram showing a second embodiment of the invention and FIG. 7 is a diagram showing waveforms appearing in the FIG. 6 embodiment. This embodiment differs from the FIG. 1 embodiment in that adders 27 and 28 are provided in such a way that a difference $\Delta kI1$ ($=kI1-kI2$) between output signals of the current detectors 11 and 12 is applied as an input signal to the current control circuit 13 and a difference $\Delta kI2$ ($=kI2-kI1$) between the output signals is applied as an input signal to the current control circuit 14. With this construction, as shown at dotted lines in FIG. 7, while output voltage V1 of the uninterruptible power supply unit 2 decreases by the action of the current control circuit 13, output voltage V2 of the uninterruptible power supply unit 3 increases by the action of the current control circuit 14. Therefore, as will be seen from comparison of FIG. 5 with FIG. 7, the present embodiment has an advantage that the effect of suppressing the voltage difference between the uninterruptible power supply can be further enhanced in comparison with the FIG. 1 embodiment. Moreover, in the stationary condition, decreasing of the output voltage can advantageously be suppressed by the action of the current control circuits 13 and 14. Accordingly, the present embodiment can provide an ideal uninterruptible power supply in which a fluctuation in output voltage dependent on the magnitude of the load can be minimized.

Figure 8:
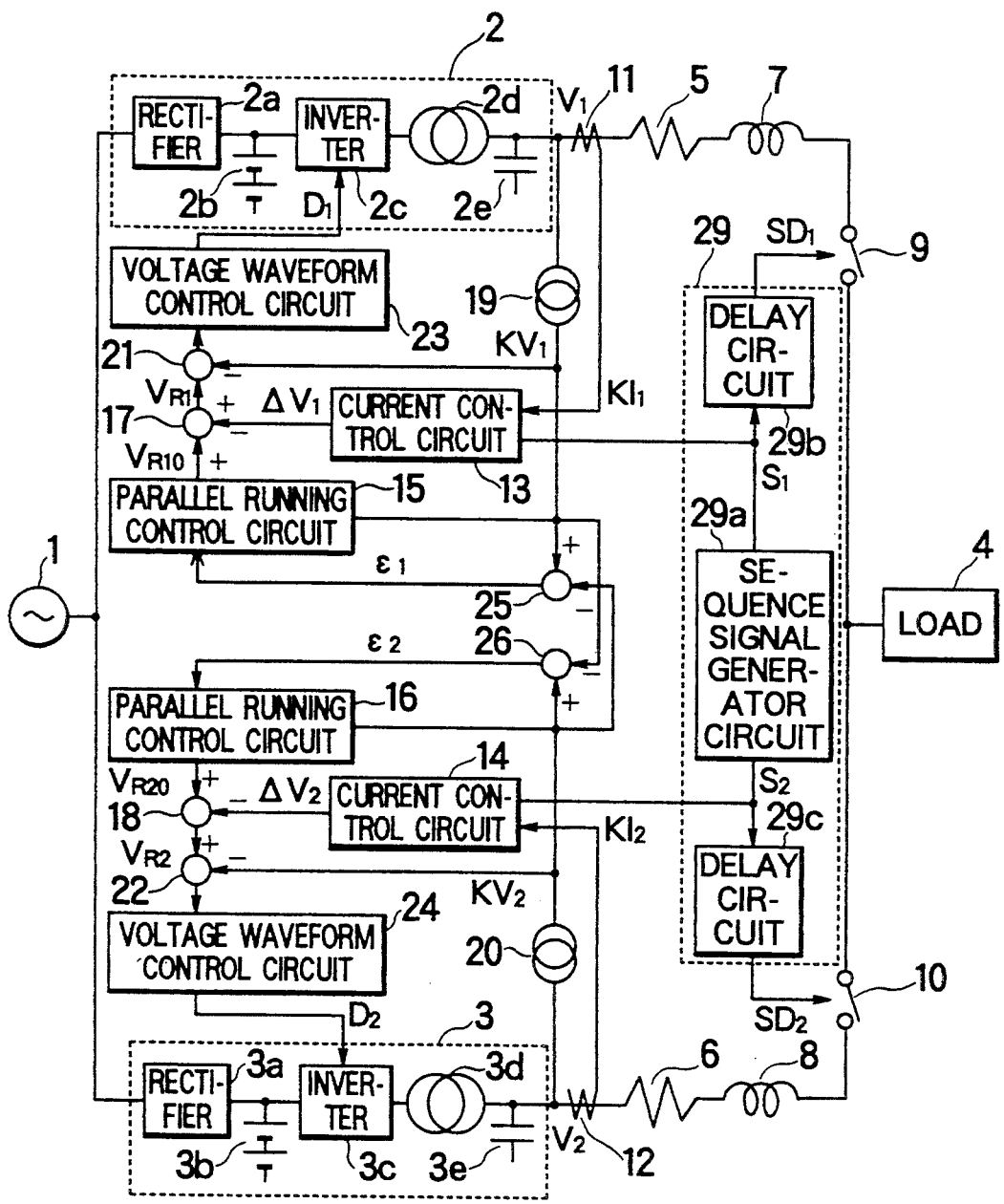
FIG. 8 is a schematic circuit construction diagram showing a third embodiment of the uninterruptible power supply to which the invention is applied.
Figure 9:
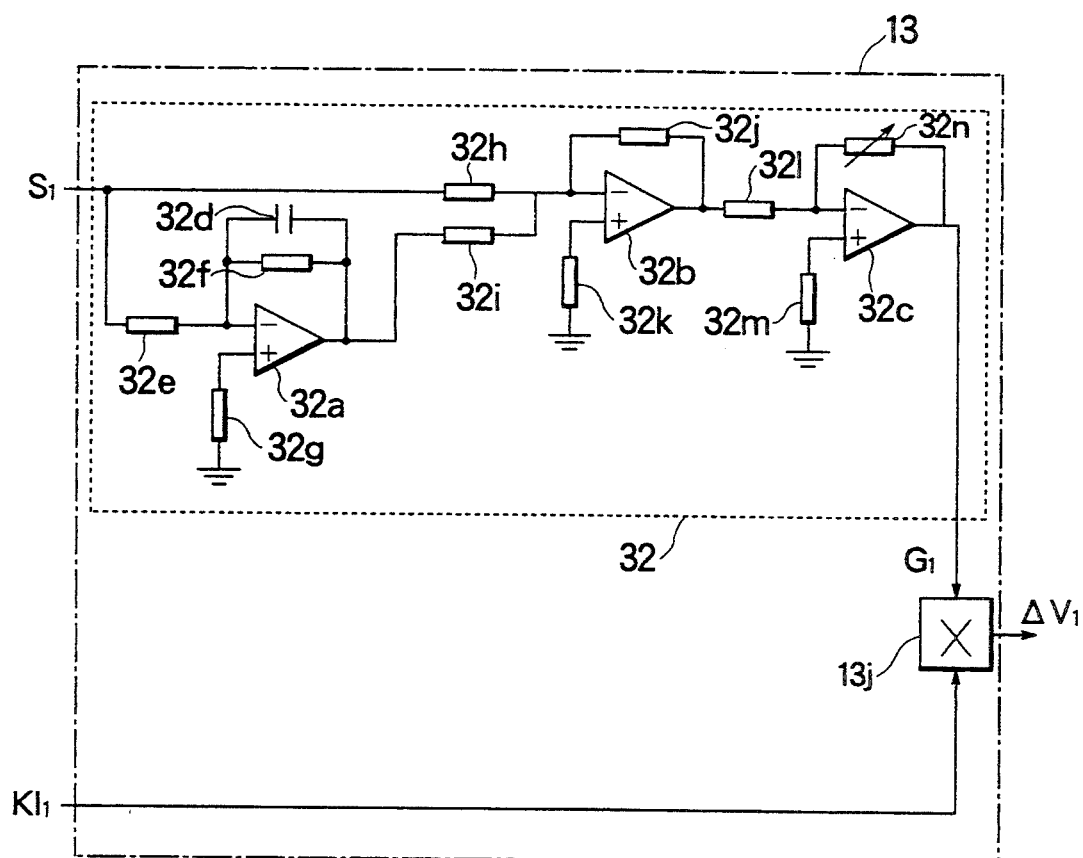
FIG. 9 is a circuit diagram showing details of a parallel running control circuit used in the FIG. 8 uninterruptible power supply.
Figure 10:
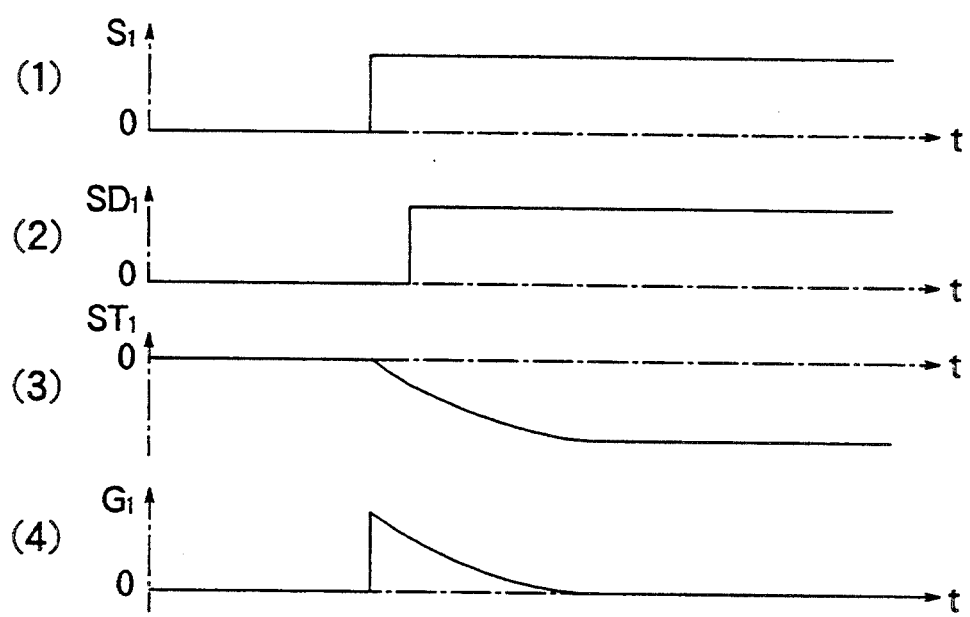
FIG. 10 is a waveform diagram for explaining the operation of the FIG. 8 uninterruptible power supply when applied with the FIG. 9 parallel running control circuit.

FIGS. 8 and 9 are schematic circuit diagrams showing a third embodiment of the invention and FIG. 10 is a diagram showing waveforms in this embodiment. The present embodiment differs from the FIG. 1 embodiment in that a sequence control circuit 29 for managing the whole of parallel running system is provided in order that sensitivity of the current control circuits 13 and 14 to signals kI1 and kI2 can be controlled by the sequence control circuit. The sequence control circuit 29 includes a sequence signal generator circuit 29a adapted to generate sequence signals S1 and S2 for control of sensitivity of the current control circuits 13 and 14, and delay circuits 29b and 29c for generating switch drive signals SD1 and SD2 which are delayed by predetermined times relative to the sequence signals S1 and $2 and applying the signals SD1 and SD2 to the switches 9 and 10, respectively. Ideally, the sensitivity of the current control circuits 13 and 14 is raised upon the parallel throw-in of uninterruptible power supply unit in which overcurrent suppression is needed but is lowered when stable parallel running proceeds or when a single uninterruptible power supply unit is in operation, thereby ensuring that a fluctuation in output voltage with respect to a change of output current can be minimized. In the present embodiment, the sensitivity of each current control circuit 13 or 14 to signal kI1 or kI2 is controlled by the sequence control circuit 29, whereby in the case of parallel throw-in of the uninterruptible power supply unit 2, the sequence signal generator circuit 29a generates a sequence signal S1 serving as a parallel throw-in command as shown at (1) in FIG.

10 and the current control circuit 14 responds to the sequence signal S1 to change sensitivity G1 as shown at (4) in FIG. 10, thus carrying out the aforementioned intention. Namely, the sensitivity G1 is raised upon the parallel throw-in, is lowered as time elapses and is almost zeroed under stationary running condition. The current control circuit 14 having such characteristics can be realized easily with construction as shown in FIG. 9. In the FIG. 9 construction, the sensitivity G1 is controlled by means of a current sensitivity control circuit comprised of operational amplifiers 32a to 32c, a capacitor 32d, resistors 32e to 32m and a variable resistor 32n. When the sequence signal S1 shown at (1) in FIG. 10 is inputted, output ST1 of the operational amplifier 32a changes as shown at (3) in FIG. 10. At that time, a value of the sensitivity G1 is determined as shown at (4) in FIG. 10 by adding levels shown at (1) and (3) in FIG. 10. The switch 9 in FIG. 8 is needed to be operated after settlement of the sensitivity G1 of the current control circuit 13 and therefore it is activated by a switch drive signal SD1 which is obtained by delaying the sequence signal S1 by means of the delay circuit 29b. The peak value of sensitivity G1 can be adjusted by manipulating the variable resistor 32n.

Figure 11:
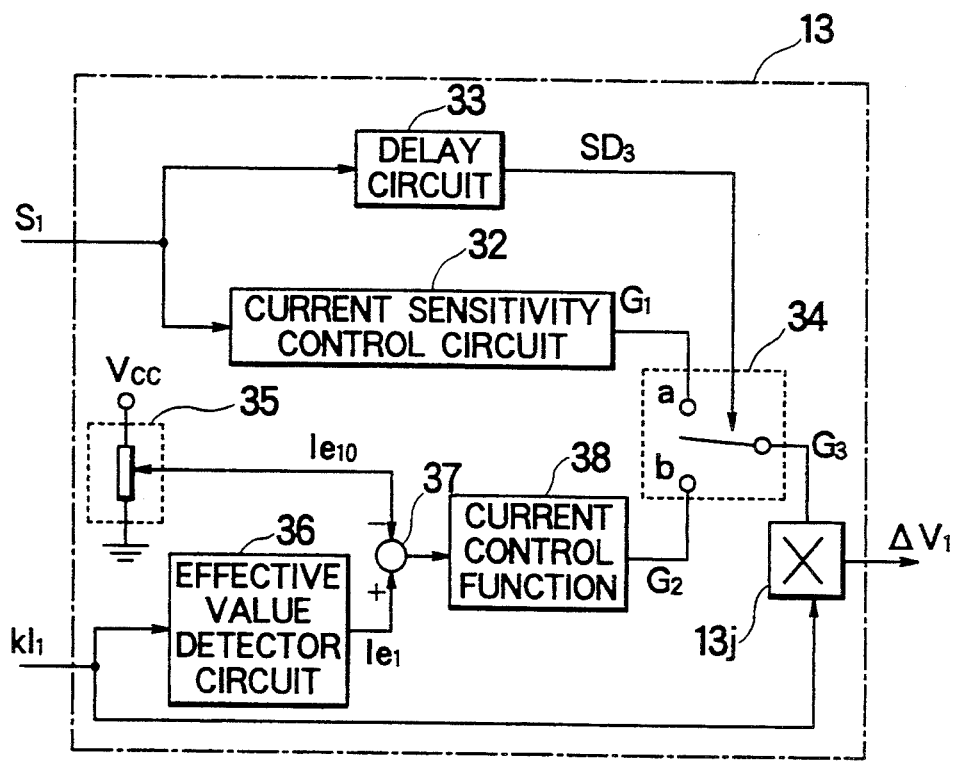
FIG. 11 is a circuit diagram showing details of another embodiment of the parallel running control circuit used in the FIG. 8 uninterruptible power supply.
Figure 12:
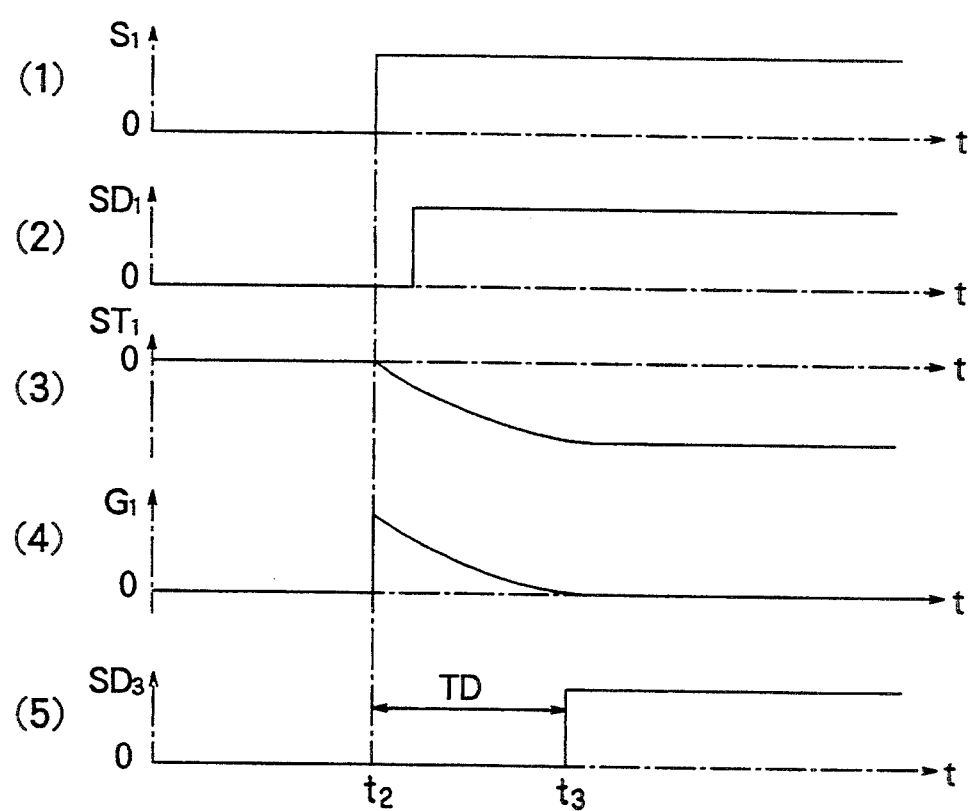
FIG. 12 is a waveform diagram for explaining the operation of the FIG. 8 uninterruptible power supply when applied with the FIG. 11 parallel running control circuit.

FIG. 11 shows another embodiment of current control circuit 13 (or 14) directed to a current control circuit which permits parallel running of uninterruptible power supply having different apparatus capacities. The current control circuit of this embodiment includes a current sensitivity control circuit 32 (shown in FIG. 9) and a delay circuit 33 both connected to the output side of the sequence signal generator circuit 29a, an effective value detector circuit 36 connected to the output side of the current detector 11, a variable resistor 35 for setting a reference current value Ie10 on the basis of Vcc, an adder 37 for comparing an output signal Ie1 of the effective value detector circuit 36 with the reference current value Ie10, a current control function 38 connected to the output side of the adder 37, a switch 34 responsive to an output signal from the delay circuit 33 to switch output signals of the current sensitivity control circuit 32 and current control function 38, and a multiplier 13j. In this current control circuit, the switch 34 responding to output signal D3 of the delay circuit 33 operates to deliver G3=G1 when SD3 is low level and G3=G2 when SD3 is high level. The signal G2 delivered out of the current control function 38 is a signal for making the effective value Ie1 of current kI1 produced through the effective value detector circuit 36 approximate the setpoint Ie10 set by the variable resistor 35. Accordingly, with the output signal SD3 of delay circuit 33 being high level, the effective value Ie1 of current I1 is controlled in accordance with the setpoint Ie10 and hence, by changing the setpoint Ie10 of output current effective value for each of the uninterruptible power supply, the amount of current shared by or under the charge of each apparatus can be controlled. FIG. 12 is an operational waveform diagram for the FIG. 11 circuit. As shown therein, the output signal SD1 of the delay circuit 33 has a waveform which is delayed by time TD determined by the delay circuit 33 relative to the sequence signal S1 of the sequence signal generator circuit 29a. In this case, the current control circuit 13 performs simple current suppressing operation before time point t3 and then performs current sharing control operation after time point t3. Accordingly, in accordance with the present embodiment, it is possible by adjusting delay time TD to carry out the current suppressing operation during continuation of a transient response upon parallel throw-in of each uninterruptible power supply and the current sharing operation after establishment of stationary condition.

Figure 13:
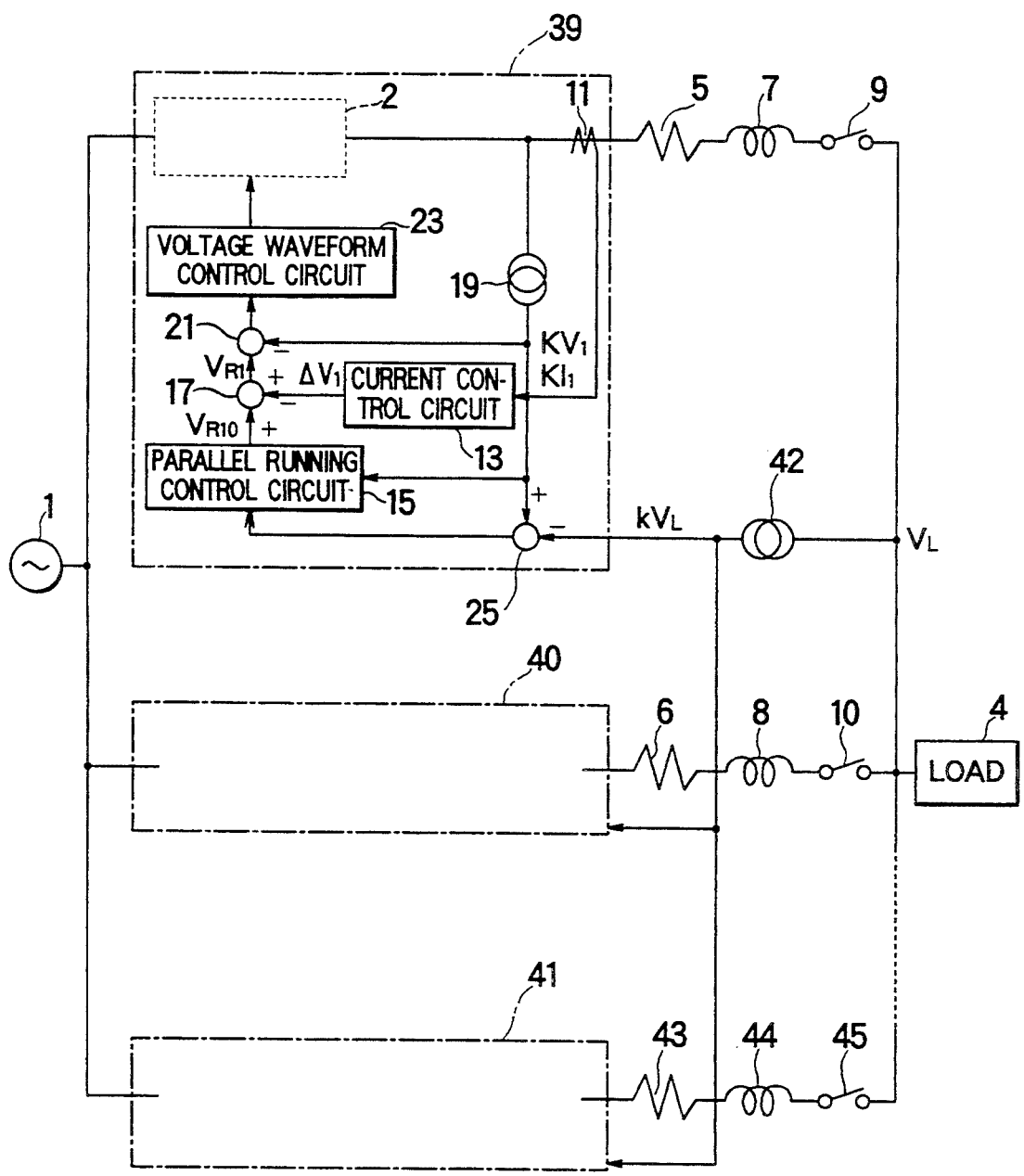
FIG. 13 is a schematic circuit construction diagram showing a fourth embodiment of the uninterruptible power supply applied with the invention.
Figure 14:
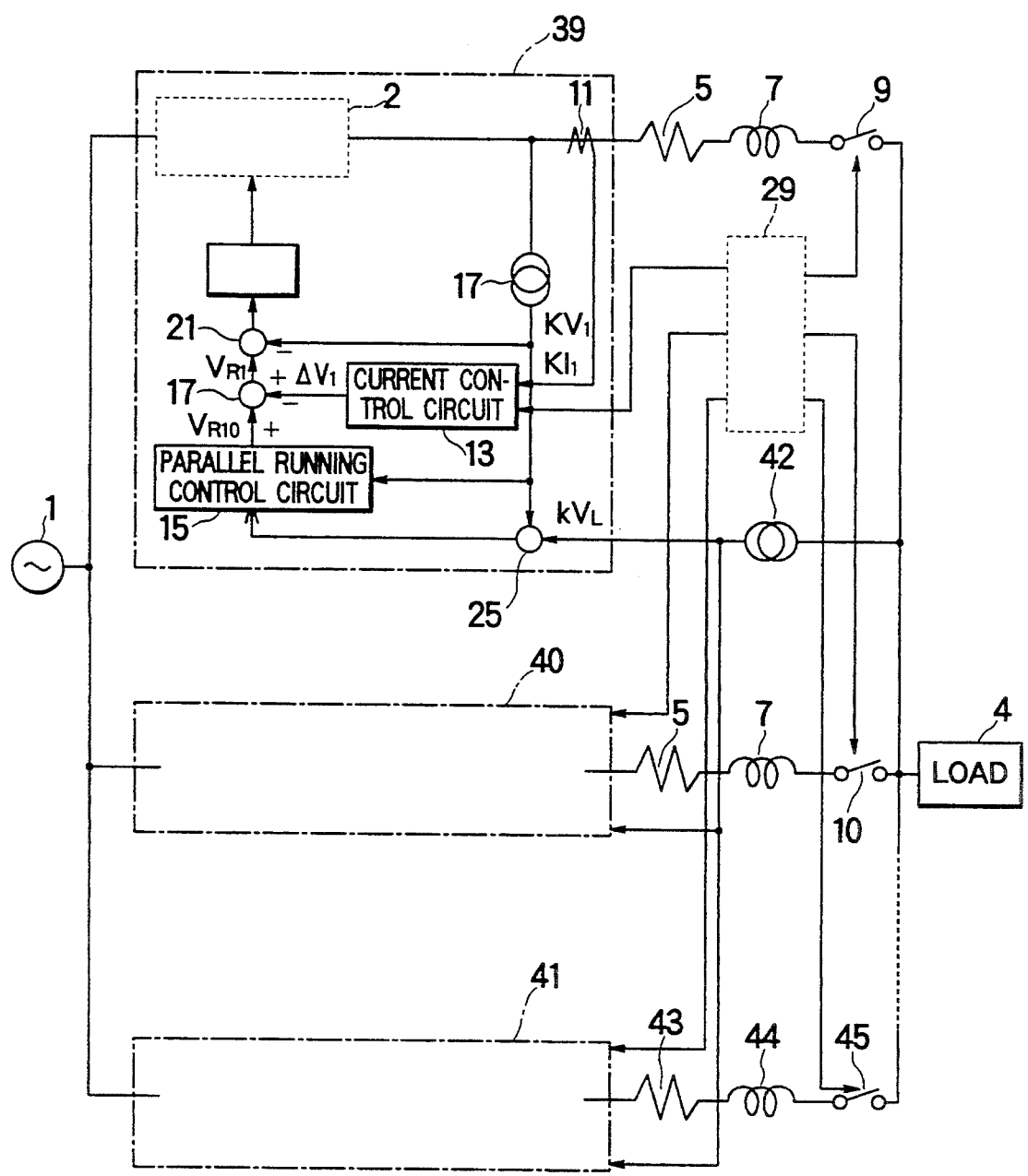
FIG. 14 is a schematic circuit construction diagram showing a fifth embodiment of the uninterruptible power supply applied with the invention.

FIG. 13 and 14 show fourth and fifth embodiments of the invention, depicting the construction useful to operate a number of uninterruptible power supply in parallel. In FIG. 13, three uninterruptible power supply 39, 40 and 41 can be thrown in in parallel to each other by using switches 9, 10 and 45. Load voltage $V_L$ is passed through a voltage detector 42 to provide signal $kV_L$ which is proportional to the load voltage and represents an average voltage of respective inverters, and a parallel running control circuit 15 (ones in 40 and 41 are not illustrated) uses the signal $kV_L$ as a reference waveform adapted to decide differences in voltage and phase between output voltages of the respective inverters. Accordingly, an adder 25 is operative to detect a difference between a signal kV1 from voltage detector 19 and the signal $kV_L$ from voltage detector 42. Through this, parallel running of a number of apparatus can be ensured. The fifth embodiment shown in FIG. 14 is a modification of FIG. 8 wherein a sequence control circuit 29 is used to change sensitivity of current control circuits of uninterruptible power supply 39, 40 and 41 and to drive switches at timings delayed by predetermined times relative to the sequence signal. Denoted by 43 is a resistor and by 44 is a reactor.

Figure 15:
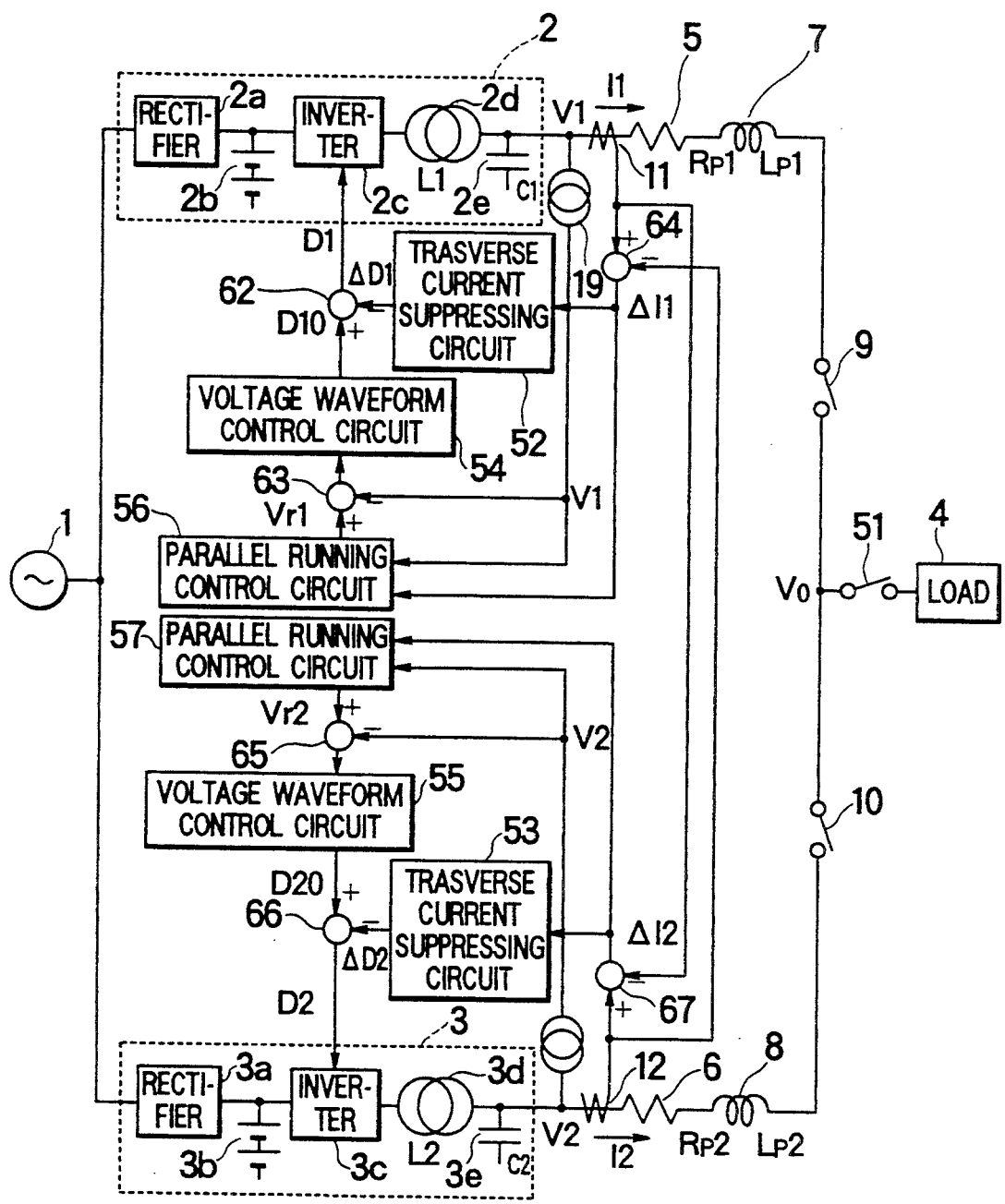
FIG. 15 is a schematic circuit construction diagram showing a sixth embodiment of the uninterruptible power supply applied with the invention.

FIG. 15 is a schematic diagram showing a sixth embodiment. In FIG. 15, two uninterruptible power supply 2 and 3 are connected at their input sides to a commercial alternating current system land connected at their output sides to a load 4 through switches 9 and 10, respectively, and through a switch 51. A series connection of resistor 5 and reactor 7 and a series connection of resistor 6 and reactor 8 respectively connected to the output sides of the uninterruptible power supply 2 and 3 represent wiring impedance. In each of the uninterruptible power supply 2 and 3, normally, AC power fed from the commercial alternating current system 1 is converted into DC power by a rectifier 2a or 3a and the DC power is fetched into an inverter 2c or 3c but in the event of power failure, DC power fed from a storage battery 2b or 3b serving as a DC power supply is fetched into the inverter 2c or 3c so as to be converted thereby into AC power and the AC power is supplied to the load 4 through a transformer 2d or 3d. The transformer 2d or 3d is essentially adapted to insulate the load 4 from the commercial alternating current system 1 but its leakage reactance cooperates with the capacitor 2e or 3e to constitute an output filter of the inverter 2c or 3c. In order for each inverter 2c or 3c to be brought into stable parallel running, operation of each of the inverters 2c and 3c is controlled by running control means constructed as will be described below.

Each running control means includes a cross current suppressing circuit 52 or 53, a voltage waveform control circuit 54 or 55, a parallel running control circuit 56 or 57, a voltage detector 19 or 20, a current detector 11 or 12, and adders 62, 63 and 64 or 65, 66 and 67. The current detector 11 or 12 is constructed as output current detection means for detecting current on the output side of the inverter 2c or 3c. The adder 64 or 67 is constructed as current difference calculation means for calculating a difference between detection values of the current detectors 11 and 12 and delivering a cross current signal equivalent to a current flowing between the inverters 2c and 3c. The cross current suppressing circuit 52 or 53 is constructed as cross current suppressing signal generation means for generating a cross current suppressing signal for suppression of the cross current to zero on the basis of the output signal of the adder 64 or 67.

The voltage detector 19 or 20 is constructed as output voltage detection means for detecting a voltage on the output side of the inverter 2c or 3c. The parallel running control circuit 56 or 57 is constructed as voltage waveform command generation means responsive to the output signal of the adder 64 or 67 and the output voltage of the voltage detector 19 or 20 to generate a voltage waveform command Vr1 or Vr2 which specifies amplitude and frequency of the output voltage of each inverter 2c or 3c. The adder 63 or 65 is constructed as a voltage difference calculation means for calculating a difference between voltage waveform command Vr1 and detection voltage V1 of the voltage detector 19 or a difference between voltage waveform command Vr2 and detection voltage V2 of the voltage detector 20. The voltage waveform control circuit 54 or 55 is constructed as duty command generation means for generating a duty command adapted to suppress to zero a signal from the adder 63 or 65. The adder 62 or 66 is constructed as duty command correction means which corrects a duty command D10 or D20 from the voltage waveform control circuit 54 or 55 with a cross current suppressing signal AD1 or AD2 from the cross current suppressing circuit 52 or 53 to deliver an ultimate duty commands D1 or D2. Each of the duty commands D1 and D2 is applied to the inverter 2c or 3c through a PWM signal generator (not shown) constituting inverter control means, so that the pulse width of a PWM signal is controlled in accordance with the duty command D1 or D2 and the PWM signal controlled in pulse width is applied to switching elements of each inverter 2c or 3c. Thus, the output voltage of each inverter 2c or 3c is controlled in accordance with the duty command D1 or D2.

Figure 16:
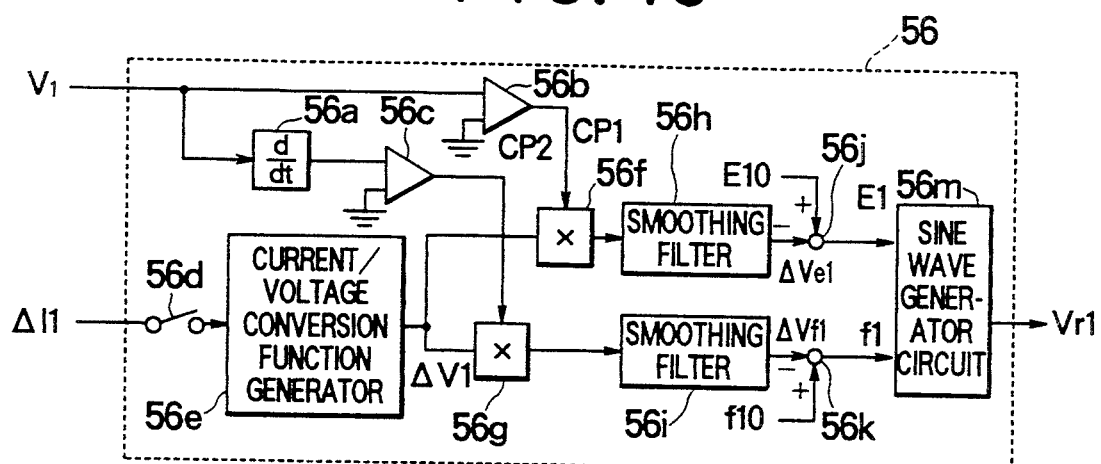
FIG. 16 is a specified construction diagram of a parallel running control circuit in FIG. 15.

The parallel running control circuit 56 or 57 may be constructed specifically as will be described with reference to FIG. 16. Since the parallel running control circuits 56 and 57 have the same construction, a description will be given of only the parallel running control circuit 56.

Figure 17:
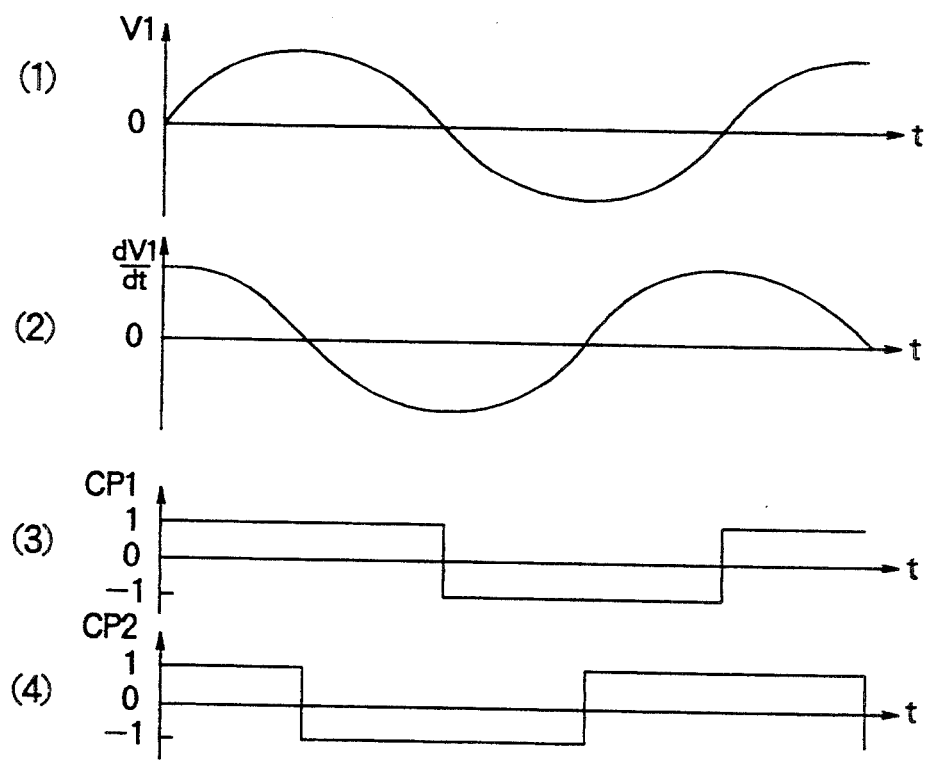
FIG. 17 is a waveform diagram for explaining the operation of the FIG. 15 uninterruptible power supply.

The parallel running control circuit 56 includes a differentiating circuit 56a, comparators 56b and 56c, a switch 56d, a current/voltage conversion function generator 56e, multipliers 56f and 56g, smoothing filters 56h and 56i, adders 56j and 56k, and a sine wave generator circuit 56m. Applied to the differentiating circuit 56a and comparator 56b is a detection voltage V1 of voltage detector 19 as shown at (1) in FIG. 17. When the output voltage V1 is inputted to the comparator 56b, a pulse signal as shown at (3) in FIG. 17 is delivered out of the comparator 56b. On the other hand, with the output voltage V1 applied to the comparator 56c through the differentiating circuit 56a, the output voltage V1 is differentiated by the differentiating circuit 56a and a signal as shown at (2) in FIG. 17 is inputted to the comparator 56c. Then the comparator 56c delivers a pulse signal CP2 whose phase leads that of the output signal of the comparator 56b by an electrical angle of 90°.

On the other hand, the switch 56d is applied with a cross current signal ΔI1 from the adder 64 and when the cross current signal ΔI1 is inputted to the current/voltage conversion function generator 56e, a voltage difference ΔV1 corresponding to a voltage obtained by multiplying the cross current signal ΔI1 by wiring impedance is delivered out of the function generator 56e. The voltage difference ΔV1 is inputted to the multipliers 56f and 56g where it is multiplied by the pulse signals CP1 and CP2, respectively. With an output signal from the multiplier 56f applied to the smoothing filter 56h, a voltage amplitude difference ΔVe1 in the form of a DC signal corresponding to a signal resulting from integral of the output signal of the multiplier 56f is delivered out of the smoothing filter 56h. On the other hand, with an output signal from the multiplier 56g applied to the smoothing filter 56i, a voltage phase difference ΔVf1 in the form of a DC signal corresponding to a signal resulting from integral of the output signal of the multiplier 56g is delivered out of the smoothing filter 56i. The voltage amplitude difference ΔVe1 is added to a reference voltage amplitude setpoint E10 at the adder 56j and a sum signal is applied as a voltage amplitude command E1 to the sine wave generator circuit 56m. The voltage phase difference Δf1 is added to a reference frequency setpoint f10 at the adder 56k and a sum signal is applied as a frequency command f1 to the sine wave generator circuit 56m. The sine wave generator circuit 56m incorporates a waveform ROM and complies with the voltage amplitude command (in-phase component) E1 and frequency command (quadrature component) f1 to deliver a sinusoidal voltage waveform command Vr1 serving as a command for specifying amplitude and frequency of the output voltage of the inverter 2c.

Prior to describing the operation of the apparatus constructed as above, the basic principle of correcting differences in voltage and phase between output voltages V1 and V2 of the uninterruptible power supply 2 and 3 will first be described with reference to FIG. 18.

Figure 18:
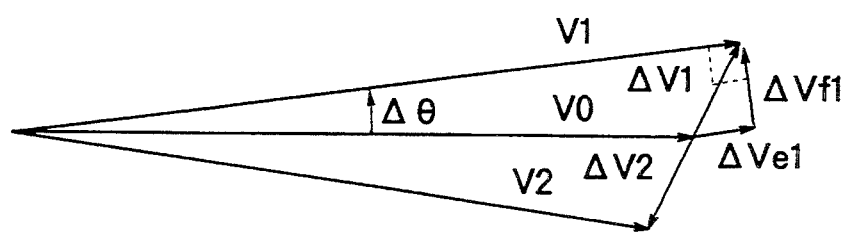
FIG. 18 is a vector diagram for explaining the principle of correction of voltage difference and phase difference in the FIG. 15 uninterruptible power supply.

When the uninterruptible power supply 2 and 3 are first brought into parallel running by closing the switches 9 and 10 shown in FIG. 15, output voltages V1 and V2 of the respective apparatus assume voltage vectors as shown in FIG. 18. Here, Vo is a voltage indicative of an average value of the output voltages V1 and V2 (Vo=(V1+V2)/2) and when a phase difference or an amplitude difference takes place between the output voltages V1 and V2, there occur voltage differences ΔV1 and ΔV2. When the voltage difference ΔV1 is decomposed into a component ΔVe1 (in-phase component) parallel to the output voltage V1 and a component ΔVf1 orthogonal thereto, the parallel component ΔVe1 corresponds to a voltage amplitude difference and the orthogonal or quadrature component ΔVf corresponds to a voltage phase difference. Therefore, by constructing the closed loop control system such that it suppresses ΔVe1 and ΔVf1, that is, by correcting the cross current suppressing signal ΔD1 by the duty command D10, the inverters 2c and 3c can be allowed to be in stable parallel running.

Figure 19:
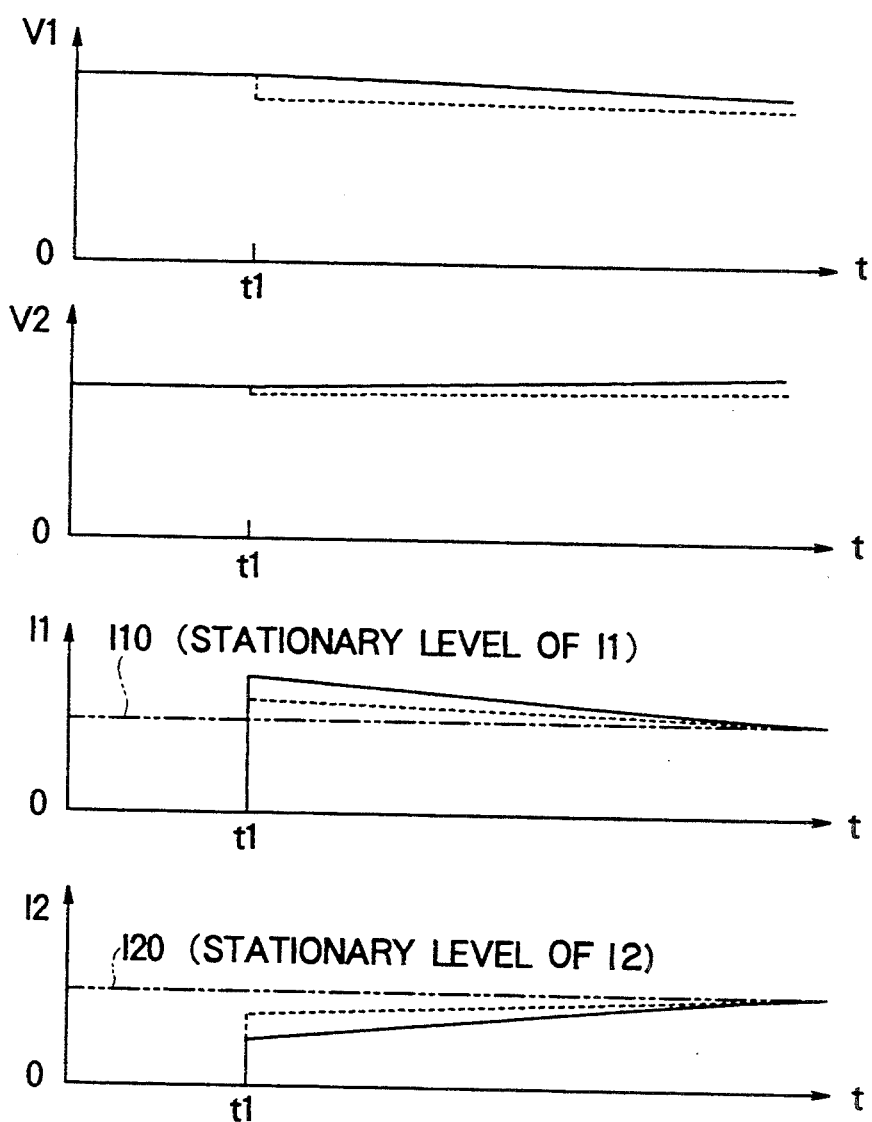
FIG. 19 is a waveform diagram for explaining the operation of the FIG. 15 uninterruptible power supply.

The operation of the above embodiment will now be described with reference to FIG. 19. Firstly, when the uninterruptible power supply 2 and 3 are desired to be brought into parallel running, the switch 56d is closed to activate the parallel running control circuit 56 and thereafter the switches 9 and 10 are thrown in. If a difference takes place between the output voltages V1 and V2 of the uninterruptible power supply 2 and 3 upon establishment of parallel running of the uninterruptible power supply 2 and 3 owing to delayed responses of the smoothing filters 56h and 56i or a difference in response characteristics between the voltage waveform control circuits 54 and 55, a cross current flows between the uninterruptible power supply 2 and 3. For example, if the output voltage V1 becomes larger than the output voltage V2 upon throw-in of the switches 9 and 10 at a timing t1, causing a cross current to flow between the uninterruptible power supply 2 and 3, output current I1 of the uninterruptible power supply 2 becomes larger than its stationary level I10 but output current I2 of the uninterruptible power supply 3 becomes smaller than its stationary level I20. At that time, the output voltages V1 and V2 and the output currents I1 and I2 exhibit response characteristics as shown at solid lines in the absence of the cross current suppressing circuits 52 and 53 but response characteristics as shown at dotted lines in the presence of the cross current suppressing circuits 52 and 53. More specifically, without the cross current suppressing circuits 52 and 53 used, after the current I1 goes beyond the stationary level I10 and the current I2 falls below the stationary level I20, an output voltage difference between the uninterruptible power supply 2 and 3 is suppressed gradually in accordance with voltage waveform commands Vr1 and Vr2 delivered out of the parallel running control circuits 56 and 57 and the currents I1 and I2 return to the stationary levels ultimately.

On the other hand, with the cross current suppressing circuits 52 and 53 used, duty commands D10 and D20 are corrected in accordance with cross current suppressing signals ΔD1 and ΔD2 generated in compliance with cross current signals ΔI1 and ΔI2, so that an output voltage difference between the uninterruptible power supply 2 and 3 is suppressed in accordance with a difference between the currents I1 and I2 and a difference between the currents I1 and I2 is also suppressed. Accordingly, in accordance with the present embodiment, even when a cross current flows between the uninterruptible power supply 2 and 3 upon establishment of parallel running of the two uninterruptible power supply 2 and 3, the cross current can be suppressed steadily, thus permitting stable operation of the uninterruptible power supply 2 and 3.

Figure 20:
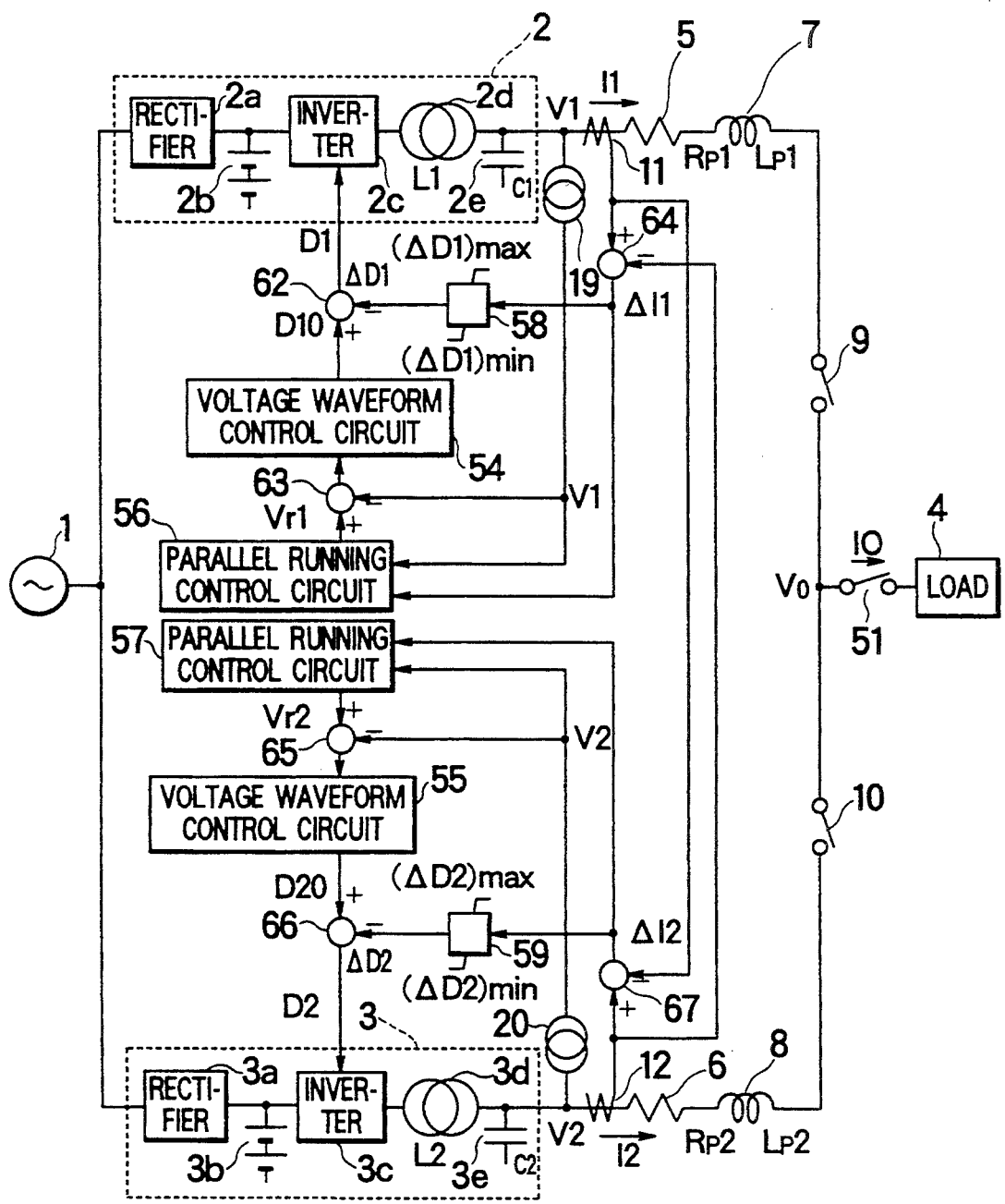
FIG. 20 is a schematic circuit construction diagram showing a seventh embodiment of the uninterruptible power supply applied with the invention.

A seventh embodiment of the invention will now be described with reference to FIG. 20.

In the present embodiment, a cross current suppressing circuit with limiter 58 and a cross current suppressing circuit with limiter 59 are provided in place of the cross current suppressing circuits 52 and 53 shown in FIG. 15. The remaining components are the same as those of FIG. 15 and identical components to those in FIG. 15 are designated by identical reference numerals and will not be described herein.

The cross current suppressing circuit 58 or 59 constitutes cross current suppressing signal generation means which responds to output signal ΔI1 or ΔI2 of the adder 64 or 67 to generate a cross current suppressing signal ΔD1 or ΔD2 and which also acts as cross current signal limiting means for limiting the magnitude of cross current signal to a range of setpoints. More specifically, the cross current suppressing circuit 28 or 29 is so designed as to limit cross current suppressing signal ΔD1 to (ΔD1)min ≦ ΔD1 ≦ (ΔD1)max or cross current suppressing signal AD2 to (ΔD2)min ≦ ΔD2 ≦ (ΔD2)max.

By using the cross current suppressing circuits with limitters 58 and 59 constructed as above, a fluctuation in output voltage can be suppressed when the load 4 is driven by only the uninterruptible power supply 2 with the switches 9 and 51 closed.

More particularly, when the switches 9 and 51 are closed, output current I1 of the uninterruptible power supply 2 equals load current Io and output current I2 of the uninterruptible power supply 3 is zero on account of opening of the switch I10. At that time, ΔI1=Io and ΔI1=−Io take place and in spite of the fact that any cross current does not flow actually between the uninterruptible power supply 2 and 3, the output voltages of the uninterruptible power supply 2 and 3 vary greatly in the case of the embodiment shown in FIG. 15. Contrary to this, in the present embodiment, the cross current suppressing signal is limited to the range of constant values and therefore a fluctuation in the output voltage of the uninterruptible power supply 2 or 3 can be minimized. Accordingly, in accordance with the present embodiment, even when the value of ΔI1 or ΔI2 changes greatly, the cross current suppressing signal ΔD1 or ΔD2 is confined within the range of constant values, thereby ensuring that running of one of the uninterruptible power supply 2 and 3 can be allowed and additional start or stop of the uninterruptible power supply 2 or 3 can be permitted.

Figure 22:
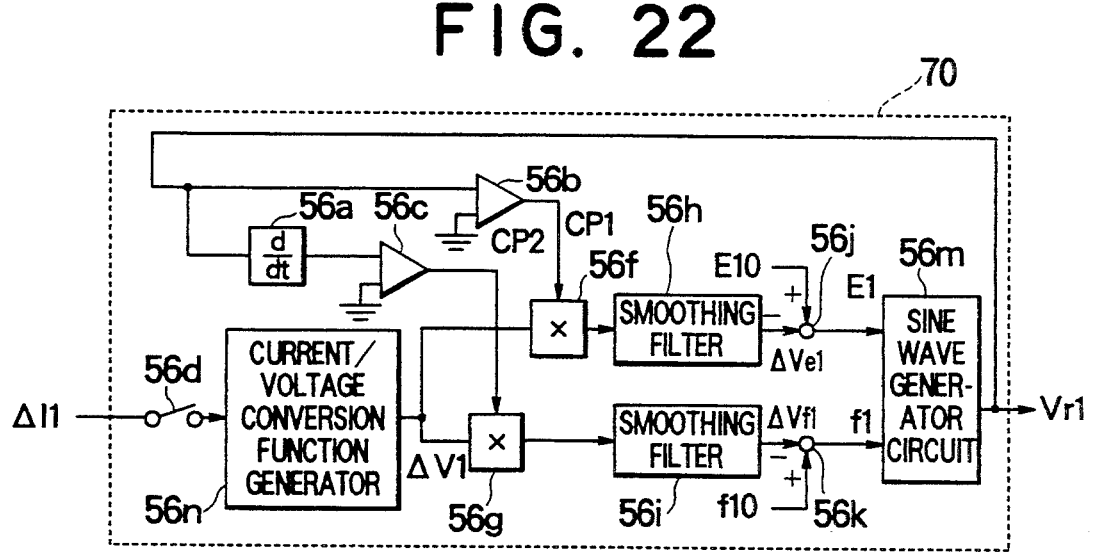
FIG. 22 is a specified construction diagram of a parallel running control circuit in FIG. 21.
Figure 23:
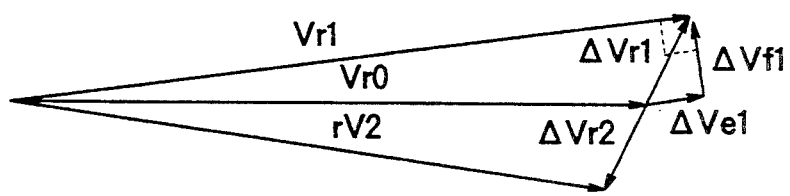
FIG. 23 is a vector diagram for explaining the function of a current/voltage conversion function.

An eighth embodiment of the invention will now be described with reference to FIGS. 21 to 23.

In the present embodiment, parallel running suppressing circuits 70 and 71 are used in place of the parallel running suppressing circuits 56 and 57. The remaining components are the same as those of FIG. 15 and identical components are designated by identical reference numerals and will not be described herein. Structurally, the parallel running control circuits 70 and 71 are identical and so specific construction of only the parallel running control circuit 70 is depicted in FIG. 22.

The parallel running control circuit 70 includes a differentiating circuit 56a, comparators 56b and 56c, a switch 56d, multipliers 56f and 56g, smoothing filters 56h and 56i, adders 56j and 56k, a sine wave generator circuit 56m, and a current/voltage conversion function generator 56n. Structurally, the parallel running control circuit 70 is identical to the parallel running control circuit 56 with the exception that the differentiating circuit 56a and comparator 56b receive as an input signal a voltage waveform command Vr1 in place of output voltage V1 and the current/voltage conversion function generator 56n incorporates a current/voltage conversion function different from that of the current/voltage conversion function generator 56e.

Thus, the parallel running control circuit 70 is constructed as voltage waveform command generation means responsive to a cross current signal ΔI1 and a voltage waveform command Vr1 to generate a voltage waveform command Vr1 corrected by the cross current signal ΔI1. Further, setting of the current/voltage conversion function generator 56n is done in consideration of the fact that when there is a difference between voltage waveform commands Vr1 and Vr2 at the time that the uninterruptible power supply 2 and 3 are brought into parallel operation, there occurs a difference between output currents shared by the uninterruptible power supply 2 and 3 and as a result a cross current ΔI1 flows. More specifically, when half the difference between Vr1 and Vr2 is defined by a vector of ΔVr1 as shown in FIG. 23, a correlation determined by characteristics of the cross current suppressing circuit 52 and voltage waveform control circuit 54 is established between the difference $\Delta Vr1$ and the cross current $\Delta I1$. Conversely, $\Delta Vr1$ can therefore be known from cross current $\Delta I1$ and that correlation is set, in terms of a function, in the current/voltage conversion function generator 56n.

In the present embodiment, even when a cross current flows between the uninterruptible power supply 2 and 3 upon establishment of parallel running of the uninterruptible power supply 2 and 3, duty commands D10 and D20 are corrected by cross current suppressing signals $\Delta D1$ and $\Delta D2$ and consequently, as in the foregoing embodiments, the cross current can be suppressed steadily to permit stable parallel running of the uninterruptible power supply 2 and 3. Further, since in the present embodiment the conversion function of the current/voltage conversion function generator 56n can be determined regardless of the wiring impedance represented by resistors 5 and 6 as well as reactors 7 and 8, the influence of a difference in the packaging condition such as wiring length upon the conversion function can be suppressed.

Figure 24:
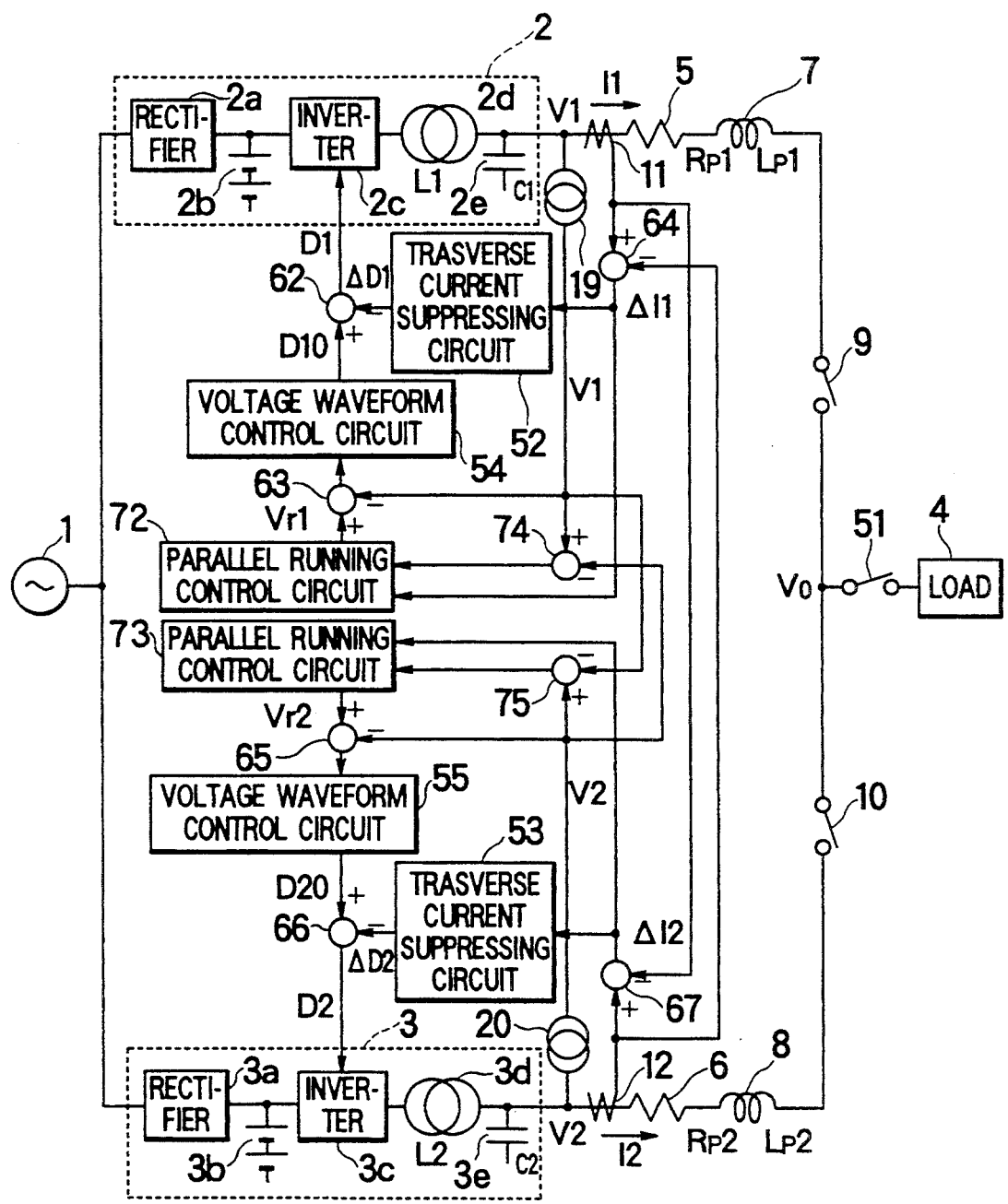
FIG. 24 is a schematic circuit construction diagram showing a ninth embodiment of the uninterruptible power supply applied with the invention.

A ninth embodiment of the invention will now be described with reference to FIGS. 24 and 25.

Figure 21:
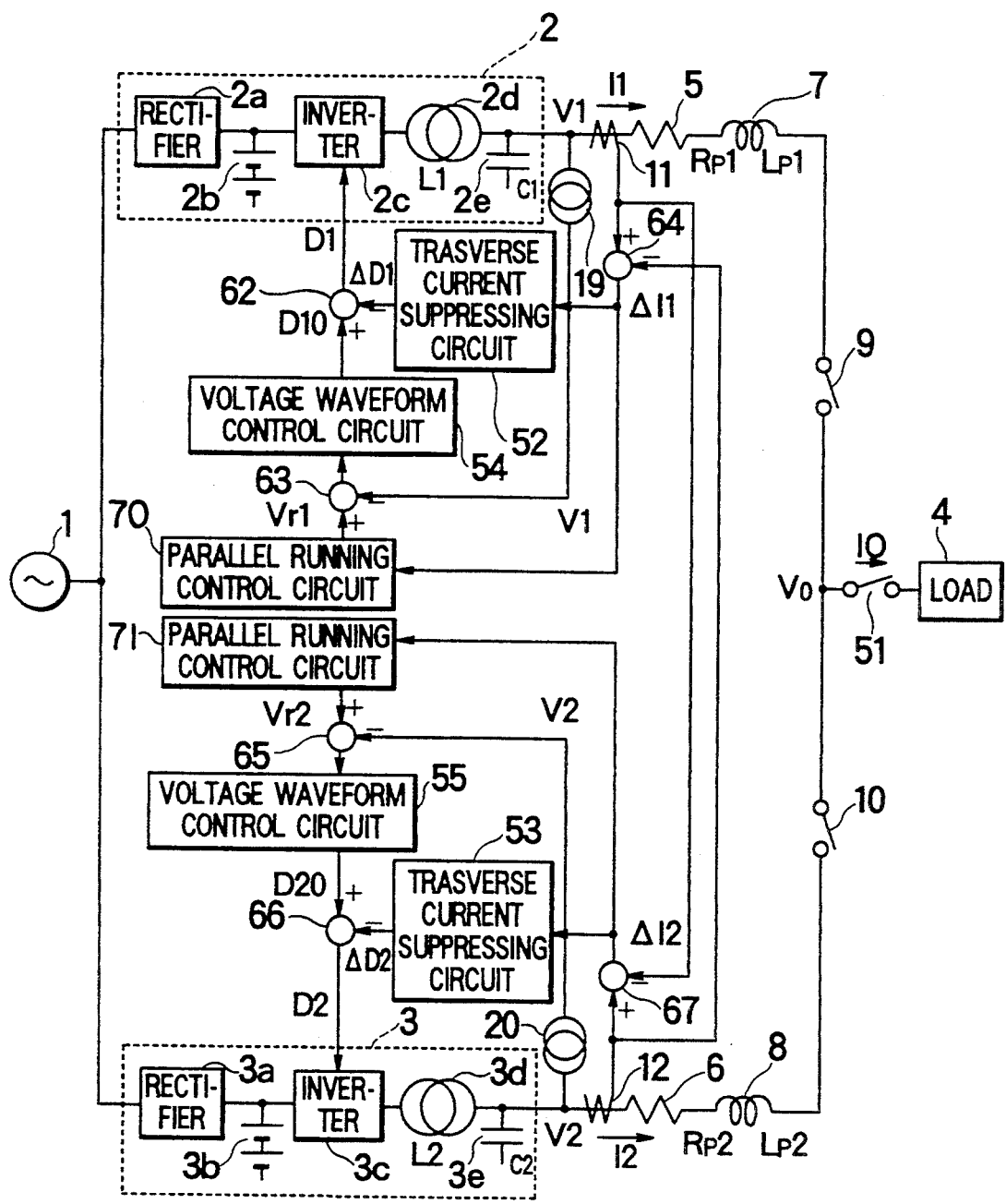
FIG. 21 is a schematic circuit construction diagram showing an eighth embodiment of the uninterruptible power supply applied with the invention.

Structurally, the present embodiment is identical to FIG. 21 with the exception that parallel running control circuits 72 and 73 are used in place of the parallel running control circuits 70 and 71 shown in FIG. 21, adders 74 and 75 are additionally provided serving as output voltage difference calculation means for calculating a difference between output voltages of the voltage detectors 19 and 20 and output signals of the adders 74 and 75 are applied to the parallel running control circuits 72 and 73, respectively. The remaining components are identical to those of FIG. 21 and identical components to those in FIG. 21 are designated by identical reference numerals and will not be described herein. Structurally, the parallel running control circuits 72 and 73 are identical and only specific construction of the parallel running control circuit 72 is shown in FIG. 25.

Figure 25:
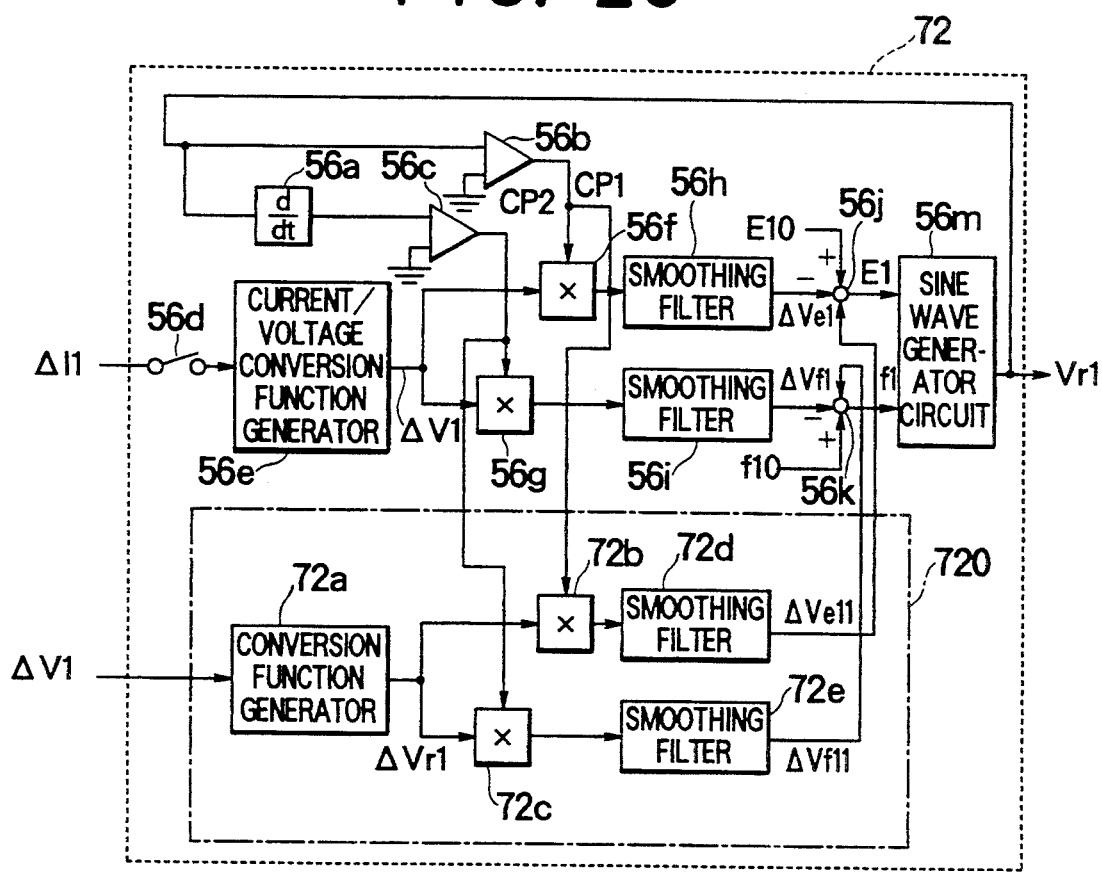
FIG. 25 is a specified construction diagram of a parallel running control circuit in FIG. 24.
Figure 26:
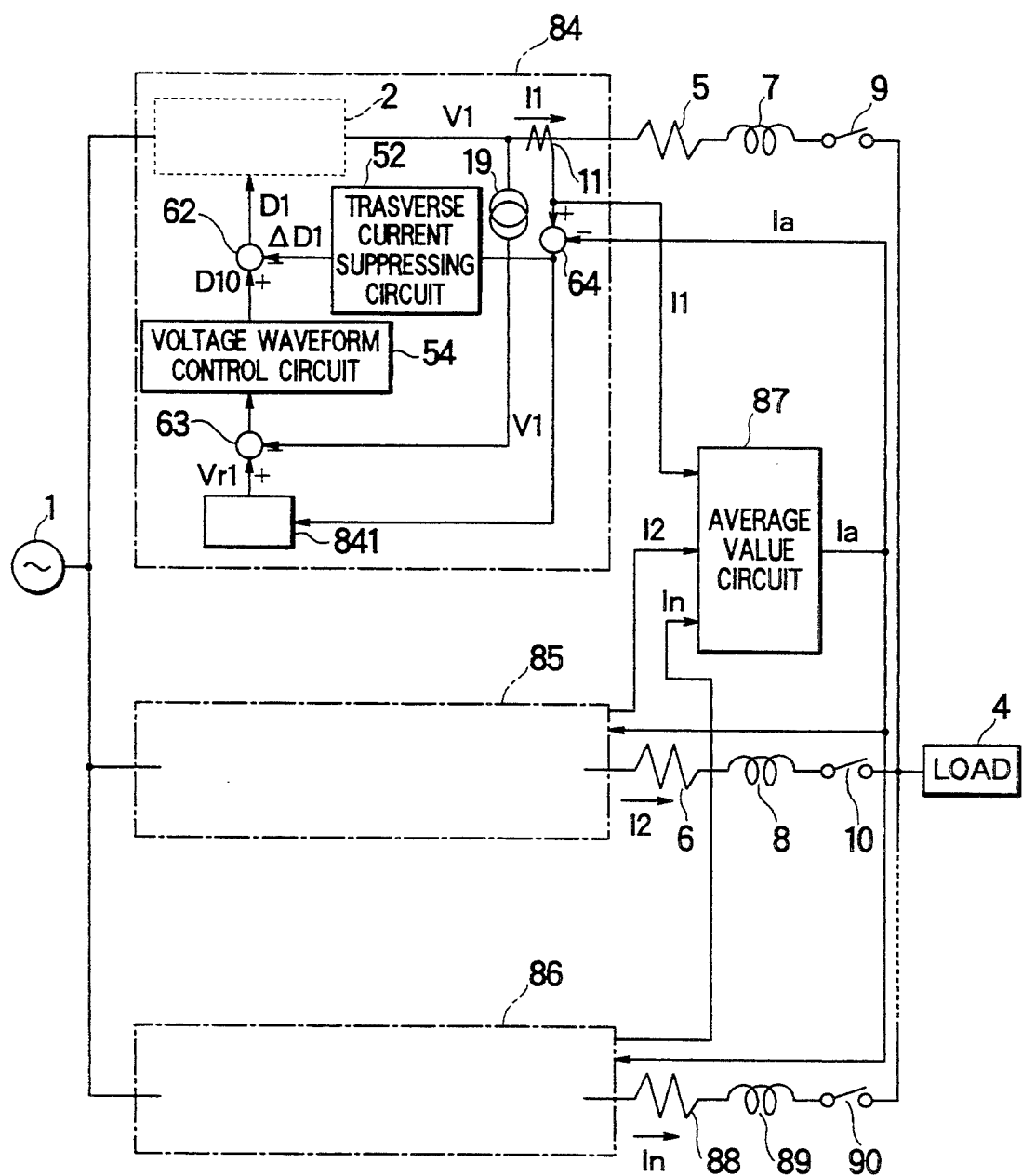
FIG. 26 is a schematic circuit construction diagram showing a tenth embodiment of the uninterruptible power supply applied with the invention.

As shown in FIG. 25, in addition to the components of the parallel running control circuit 70, the parallel running control circuit 72 includes a conversion function generator 72a, multipliers 72b and 72c and smoothing filters 72d and 72e. The conversion function generator 72a is supplied with a signal delivered out of the adder 74 and representative of a difference $\Delta V1$ between output voltages V1 and V2 so as to generate from the difference $\Delta V1$ a difference $\Delta Vr1$ of voltage waveform command. The difference $\Delta Vr1$ is then inputted to the smoothing filters 72d and 72e through the multipliers 72b and 72c. Delivered out of the smoothing filters 72d and 72e are difference signals $\Delta Ve11$ and $\Delta Vf11$ which in turn are applied to the adders 56j and 56k. Thus, the parallel running control circuit 72 is constructed as voltage waveform command generation means responsive to voltage waveform command Vr1, cross current $\Delta I1$ and difference $\Delta V1$ to correct the voltage waveform command Vr1 with the cross current $\Delta I1$ and difference $\Delta V1$ and deliver corrected voltage waveform command Vr1.

Since in accordance with the present embodiment the difference $\Delta Vr1$ of voltage waveform command can be determined in accordance with the difference $\Delta V1$ even in the absence of current difference $\Delta I1$ detected, output voltages of the uninterruptible power supply 2 and 3 can be suppressed even when the switches 9 and 10 are both opened. In other words, an output voltage difference between the uninterruptible power supply 2 and 3 can be suppressed before bringing the uninterruptible power supply 2 and 3 into parallel running so that a cross current which flows transiently upon establishment of parallel running of the uninterruptible power supply 2 and 3 following closure of the switches 9 and 10 can be minimized.

A tenth embodiment of the invention directed to parallel running of three or more uninterruptible power supply will now be described.

Uninterruptible power supply 84, 85 and 86 are identical in construction and running control means for controlling the operation of an inverter of each uninterruptible power supply is structurally identical to one shown in FIG. 21. Further, adder 64 of each of the uninterruptible power supply 84, 85 and 86 is supplied with not only a detection signal of current detector 11 of its own system but also a signal indicative of an average value Ia from an average value circuit 87. The average value circuit 87 fetches output power signals I1, I2 and In from the uninterruptible power supply 84, 85 and 86, determines an average value of these signals and delivers a signal Ia representative of the average value.

In accordance with the present embodiment, a cross current suppressing signal is generated which is used to minimize the difference between the output current of the own system and an average value of the output currents of the respective uninterruptible power supply and therefore, even when a cross current flows between the uninterruptible power supply upon establishment of parallel running of the three or more uninterruptible power supply, the cross current can be suppressed steadily to permit stable parallel running of the three or more uninterruptible power supply.

The cross current suppressing circuit with limiter 58 or 59 may be used as the cross current suppressing circuit in each of the foregoing embodiments.

As has been described so far, in accordance with the invention, when a plurality of inverters are brought into parallel running, output currents of the respective inverters are monitored to detect a cross current flowing between the inverters, a cross current suppressing signal for suppressing the cross current to zero is generated, a duty command is corrected by the cross current suppressing signal and the output voltage of the inverter is controlled in accordance with the corrected duty command, thereby ensuring that even when a cross current flows between the inverters upon establishment of parallel running of the plurality of inverters, the cross current can be suppressed steadily to permit stable parallel running of the plurality of inverters.

Thus, in accordance with the invention, a cross current which flows between inverters when the inverters are brought into parallel running can be suppressed effectively to ensure stable running of each inverter and in addition, currents shared by individual apparatus can be set apparatus by apparatus and therefore parallel running between inverters of different capacities can be ensured.

We claim:

1. An apparatus for controlling parallel running of inverters for use in an inverter system in which a plurality of inverters are connected at their output sides to a load common to said inverters and an output voltage of each inverter of said inverters is controlled in accordance with a duty command, said apparatus comprising:

a plurality of output current detection means each adapted to detect an output current of each inverter of said inverters;

a plurality of output voltage detection means each adapted to detect an output voltage of each said inverter;

a plurality of current difference calculation means each adapted to calculate a difference between said output current of respective said output current detection means and deliver a cross current signal equivalent to a current flowing between said inverters;

a plurality of cross current suppressing signal generation means each adapted to respond to said cross current signal delivered out of each said current difference calculation means to generate a cross current suppressing signal for suppressing said cross current signal to zero;

a plurality of voltage waveform command generation means each adapted to respond to said output voltage of each said output voltage detection means and said cross current suppressing signal generated from each said cross current suppressing signal generation means to generate a voltage waveform command for specifying amplitude and frequency of an output voltage of each said inverter;

a plurality of voltage difference calculation means each adapted to calculate and output as a calculation value, a difference between said voltage waveform command generated from each said voltage waveform command generation means and said output voltage of each said output voltage detection means;

a plurality of duty command generation means each adapted to generate from said calculation value of each said voltage difference calculation means a duty command for suppressing said calculation value to zero;

a plurality of duty command correction means each adapted to correct said duty command generated from each said duty command generation means with said cross current suppressing signal generated from each said cross current suppressing signal generation means; and a plurality of inverter control means each adapted to control said output voltage of each said inverter in accordance with said duty command corrected by each said duty command correction means.

2. An apparatus for controlling parallel running of inverters for use in an inverter system in which a plurality of inverters are connected at their output sides to a load common to said inverters and an output voltage of each inverter of said inverters is controlled in accordance with a duty command, said apparatus comprising:

a plurality of output current detection means each adapted to detect an output current of each inverter of said inverters;

a plurality of output voltage detection means each adapted to detect an output voltage of each said inverter;

a plurality of current difference calculation means each adapted to calculate a difference between said output current of respective said output current detection means and deliver a cross current signal equivalent to a current flowing between said inverters;

a plurality of cross current suppressing signal generation means each adapted to respond to said cross current signal delivered out of each said current difference calculation means to generate a cross current suppressing signal for suppressing said cross current signal to zero;

a plurality of voltage waveform command generation means each adapted to respond to a voltage waveform command for specifying amplitude and frequency of said output voltage of each said inverter and said cross current signal calculated by each said current difference calculation means to generate a corrected voltage waveform command corrected by said cross current signal;

a plurality of voltage difference calculation means each adapted to calculate and output as a calculation value, a difference between said corrected voltage waveform command generated from each said voltage waveform command generation means and said output voltage of each output voltage detection means of said plurality of output voltage detection means;

a plurality of duty command generation means each adapted to generate from said calculation value of each said voltage difference calculation means a duty command for suppressing said calculation value to zero;

a plurality of duty command correction means each adapted to correct said duty command generated from each said duty command generation means with said cross current suppressing signal generated from each cross current suppressing signal generation means of said plurality of cross current Suppressing signal generation means; and a plurality of inverter control means each adapted to control said output voltage of each said inverter in accordance with said duty command corrected by each said duty command correction means.

3. An apparatus for controlling parallel running of inverters for use in an inverter system in which a plurality of inverters are connected at their output sides to a load common to said inverters and an output voltage of each inverter of said plurality of inverters is controlled in accordance with a duty command, said apparatus comprising;

a plurality of output current detection means each adapted to detect an output current of each inverter of said plurality of inverters;

a plurality of output voltage detection means each adapted to detect an output voltage of each said inverter;

a plurality of current difference calculation means each adapted to calculate a difference between said output current of respective said output current detection means and deliver a cross current signal equivalent to a current flowing between said inverters;

a plurality of cross current suppressing signal generation means each adapted to respond to said cross current signal delivered out of each said current difference calculation means to generate a cross current suppressing signal for suppressing said cross current signal to zero;

a plurality of output voltage difference calculation means each adapted to calculate and output as a first calculation value, a difference between said output voltage of respective said output voltage detection means;

a plurality of voltage waveform command generation means each adapted to respond to a voltage waveform command for specifying amplitude and frequency of said output voltage of each said inverter, said cross current signal calculated by each said current difference calculation means and said first calculation value of each said output voltage difference calculation means to generate a corrected voltage waveform command corrected by said cross current signal and said first calculation value of each said output voltage difference calculation means;

a plurality of voltage difference calculation means each adapted to calculate and output as a second calculation value, a difference between said corrected voltage waveform command generated from each said voltage waveform command generation means and said output voltage of each said output voltage detection means;

a plurality of duty command generation means each adapted to generate from said second calculation value of each said voltage difference calculation means, a duty command for suppressing said calculation value to zero;

a plurality of duty command correction means each adapted to correct said duty command generated from each said duty command generation means with said cross current suppressing signal generated from each said cross current suppressing signal generation means; and a plurality of inverter control means each adapted to control said output voltage of each said inverter in accordance with said duty command corrected by each said duty command correction means.

4. An apparatus for controlling parallel running of inverters for use in an inverter system in which a plurality of inverters are connected at their output sides to a load common to said inverters and an output voltage of each inverter of said plurality of inverters is controlled in accordance with a duty command, said apparatus comprising:

a plurality of output current detection means each adapted to detect an output current of each inverter of said plurality of inverters;

a plurality of output voltage detection means each adapted to detect an output voltage of each said inverter;

an average value calculation means for calculating an average value of said output current of respective said output current detection means;

a plurality of current difference calculation means each adapted to calculate and output as a cross current signal, a difference between said average value of said average value calculation means and said output current of each said output current detection means;

a plurality of cross current suppressing signal generation means each adapted to respond to said cross current signal delivered out of each said current difference calculation means to generate a cross current suppressing signal for suppressing said cross current signal to zero;

a plurality of voltage waveform command generation means each adapted to respond to a voltage waveform command for specifying amplitude and frequency of said output voltage of each said inverter and said cross current signal calculated by each said current difference calculation means to generate a corrected voltage waveform command corrected with said cross current signal;

a plurality of voltage difference calculation means each adapted to calculate and output as a calculation value, a difference between said corrected voltage waveform command generated from each said voltage waveform command generation means and said output voltage of each output voltage detection means of said plurality of output voltage detection means;

a plurality of duty command generation means each adapted to generate from said calculation value of each said voltage difference calculation means, a duty command for suppressing said calculation value to zero;

a plurality of duty command correction means each adapted to correct said duty command generated from each said duty command generation means with said cross current suppressing signal generated from each said cross current suppressing signal generation means; and a plurality of inverter control means each adapted to control said output voltage of each said inverter in accordance with said duty command corrected by each said duty command correction means.

* * * * *